US012741176B2

(12) United States Patent
Kashyap et al.

(10) Patent No.: US 12,741,176 B2
(45) Date of Patent: Sep. 22, 2026

(54) USER EXPERIENCE PLATFORM FOR CONNECTED FITNESS SYSTEMS

(71) Applicant: Peloton Interactive, Inc., New York, NY (US)

(72) Inventors: Akshay Kashyap, Long Island, NY (US); Abhishek Gaur, Medford, MA (US); Ameen Al-Khafaji, New York, NY (US); Blake Chasen, Columbus, OH (US); Bud Intonato, Brooklyn, NY (US); Chris Kruger, Washington, DC (US); Feng Huang, New York, NY (US); Konstantyn Prokopenko, Oceanside, NY (US); Mark Kudas, Minneapolis, MN (US); Matt Sonier, South Orange, NJ (US); Mete Polat, Brooklyn, NY (US); Natalia Chen, New York, NY (US); Nick Breeser, New York, NY (US); Sanjay Nichani, San Diego, CA (US); Sara Fares, Washington, DC (US); Sarang Zambare, New York, NY (US); Skyler Erickson, Ann Arbor, MI (US); Walid Wahed, San Ramon, CA (US); Athul Ramkumar, New York, NY (US); Asfiya Baig, New York, NY (US); Lihang Ying, New York, NY (US); David Stevens, New York, NY (US)

(73) Assignee: Peloton Interactive, Inc., New York, NY (US)

( * ) Notice: Subject to any disclaimer, the term of this patent is extended or adjusted under 35 U.S.C. 154(b) by 170 days.

(21) Appl. No.: 18/556,523

(22) PCT Filed: Apr. 22, 2022

(86) PCT No.: PCT/US2022/026032
§ 371 (c)(1),
(2) Date: Oct. 20, 2023

(87) PCT Pub. No.: WO2022/226365
PCT Pub. Date: Oct. 27, 2022

(65) Prior Publication Data

US 2024/0181295 A1 Jun. 6, 2024

Related U.S. Application Data

(60) Provisional application No. 63/326,508, filed on Apr. 1, 2022, provisional application No. 63/179,071, filed on Apr. 23, 2021.

(51) Int. Cl.
*A63B 24/00* (2006.01)
*A63B 71/06* (2006.01)
(Continued)

(52) U.S. Cl.
CPC ...... *A63B 24/0062* (2013.01); *A63B 24/0075* (2013.01); *A63B 71/0622* (2013.01);
(Continued)

(58) Field of Classification Search
CPC .... G06V 10/82; G06V 10/751; G06V 10/764; G06V 10/7715; G06V 40/23;
(Continued)

(56) References Cited

U.S. PATENT DOCUMENTS 11,557,215 B2 * 1/2023 Rubinstein ............... G09B 5/02
2020/0009444 A1 1/2020 Putnam
(Continued)

FOREIGN PATENT DOCUMENTS

KR 101969050 B1 4/2019
KR 20200129327 A 11/2020
WO 2020132713 A1 7/2020

OTHER PUBLICATIONS

Computer English Translation of Chinese Pat. No. CN110163038 A. (Year: 2019).*

(Continued)

*Primary Examiner* — Daniel G Mariam
(74) *Attorney, Agent, or Firm* — AMPACC Law Group, PLLC

(57) ABSTRACT

Various systems and methods that enhance an exercise or other physical activity performed by a user are described. In some embodiments, a classification system communicates with a media hub to receive images and perform various methods for classifying or detecting poses, exercises, and/or movements performed by a user during an activity. In some embodiments, the systems and methods include a movements database (dB) that stores information as entries relating individual movements to data associated with the individual movements. Various systems, including class generation systems and body focus/activity systems, can utilize the movements database when presenting class content to users and/or presenting exercise information (e.g., muscle groups worked or targeted) to the users.

14 Claims, 33 Drawing Sheets

(51) Int. Cl.

| | |
|---|---|
| ***G06N 3/045*** | (2023.01) |
| ***G06N 3/096*** | (2023.01) |
| ***G06T 11/26*** | (2026.01) |
| ***G06V 10/75*** | (2022.01) |
| ***G06V 10/764*** | (2022.01) |
| ***G06V 10/77*** | (2022.01) |
| ***G06V 10/82*** | (2022.01) |
| ***G06V 40/20*** | (2022.01) |

(52) U.S. Cl.
CPC ............ *G06N 3/045* (2023.01); *G06N 3/096* (2023.01); *G06T 11/26* (2026.01); *G06V 10/751* (2022.01); *G06V 10/764* (2022.01); *G06V 10/7715* (2022.01); *G06V 10/82* (2022.01); *G06V 40/23* (2022.01); *A63B 2024/0015* (2013.01); *A63B 2024/0068* (2013.01); *A63B 2024/0071* (2013.01); *A63B 2024/0096* (2013.01); *A63B 2071/065* (2013.01); *A63B 2220/17* (2013.01); *A63B 2220/803* (2013.01); *A63B 2220/807* (2013.01); *A63B 2230/62* (2013.01)

(58) Field of Classification Search
CPC ...... G06N 3/096; G06N 3/45; A63B 24/0062; A63B 24/0075; A63B 71/0622; A63B 2024/0015; A63B 2024/0068; A63B 2024/0071; A63B 2024/0096; A63B 2220/17; A63B 2220/803; A63B 2220/807; A63B 2230/62; G06T 11/206
See application file for complete search history.

(56) References Cited

U.S. PATENT DOCUMENTS

| | | | | |
|---|---|---|---|---|
| 2020/0047027 | A1 | 2/2020 | Ward | |
| 2021/0008413 | A1* | 1/2021 | Asikainen | G06F 3/0304 |
| 2021/0315485 | A1* | 10/2021 | Matusik | A61B 5/7264 |

OTHER PUBLICATIONS

International Search Report and Written Opinion dated Aug. 11, 2022 for International Application No. PCT/US2022/026032.
European Search Report dated Sep. 13, 2024 for European patent application No. 22792618.5.
Ching-Hang Chen et al. "3D Human Pose Estimation=2D Pose Estimation + Matching", arxiv.org, Cornell University Library, Dec. 20, 2016; 9 pages.
John F et al. "Assessing Performance of Aerobic Routines using Background Subtraction and Intersected Image Region", 2019 International Conference on Computer and Drone Applications (ICONDA), IEEE, Dec. 19, 2019; pp. 38-41.
Hossam Isack et al. "RePose: Learning Deep Kinematic Priors for Fast Human Pose Estimation", arxiv.org, Cornell University Library; Feb. 10, 2020; 9 pages.
Munea Tewodros Legesse et al: "The Progress of Human Pose Estimation: A Survey and Taxonomy of Models Applied in 2D Human Pose Estimation", IEEE Access, IEEE, USA; Jul. 20, 2020; pp. 133330-133348; vol. 8, 20.

* cited by examiner

1600

| MOVEMENT (1620) | CONTEXT INFO (1630) | ML IDENTIFIER (1640) | RELATED MOVEMENTS (1650) | RELATED CONTENT (1660) |
|---|---|---|---|---|
| BICEP CURL (1610) | BICEP.CURLINFO<br>DUMBELL<br>ARMS<br>BICEP | ALGORITHM 1.1 | HAMMER CURL | CURL_VIDEO_BEG |
| HAMMER CURL | HAM.CURLINFO<br>DUMBELL<br>ARMS<br>FOREARM/BICEP | ALGORITHM 1.2 | BICEP CURL | CURL_VIDEO_BEG |
| PUSH UP | PUSHUP.INFO<br>MAT<br>ARMS/CHEST<br>TRICEPS/PECS | ALGORITHM 2.1 | PUSH UP VARs | PUSHUP_VIDEO |
| KNEE PUSH UP | KNEEPUSH.INFO<br>MAT<br>ARMS/CHEST<br>TRICEPS/PECS | ALGORITHM 2.4 | PUSH UP | KNEEPUSHUP_VIDEO |

MOVEMENTS DATABASE

USER EXPERIENCE PLATFORM FOR CONNECTED FITNESS SYSTEMS

CROSS REFERENCE TO RELATED APPLICATIONS

This application is a national phase entry of International Application No. PCT/US2022/026032 filed Apr. 22, 2022, which claims priority to U.S. Provisional Patent Application No. 63/179,071, filed on Apr. 23, 2021, entitled USER EXPERIENCE PLATFORM FOR CONNECTED FITNESS SYSTEMS, and U.S. Provisional Patent Application No. 63/326,508, filed on Apr. 1, 2022, entitled USER EXPERIENCE PLATFORM FOR CONNECTED FITNESS SYSTEMS, which are hereby incorporated by reference in their entirety.

BACKGROUND

The world of connected fitness is an ever-expanding one. This world can include a user taking part in an activity (e.g., running, cycling, lifting weights, and so on), other users also performing the activity, and other users doing other activities. The users may be utilizing a fitness machine (e.g., a treadmill, a stationary bike, a strength machine, a stationary rower, and so on), or may be moving through the world on a bicycle.

The users can also be performing other activities that do not include an associated machine, such as running, strength training, yoga, stretching, hiking, climbing, and so on. These users can have a wearable device or mobile device that monitors the activity and may perform the activity in front of a user interface (e.g., a display or device) presenting content associated with the activity.

The user interface, whether a mobile device, a display device, or a display that is part of a machine, can provide or present interactive content to the users. For example, the user interface can present live or recorded classes, video tutorials of activities, leaderboards and other competitive or interactive features, progress indicators (e.g., via time, distance, and other metrics), and so on.

While current connected fitness technologies provide an interactive experience for a user, the experience can often be generic across all or groups of users, or based on a few pieces of information (e.g., speed, resistance, distance traveled) about the users who are performing the activities.

BRIEF DESCRIPTION OF THE DRAWINGS

Embodiments of the present technology will be described and explained through the use of the accompanying drawings.

FIG. 16 is a table that illustrates an example movements database for the exercise platform.

Figure 1:
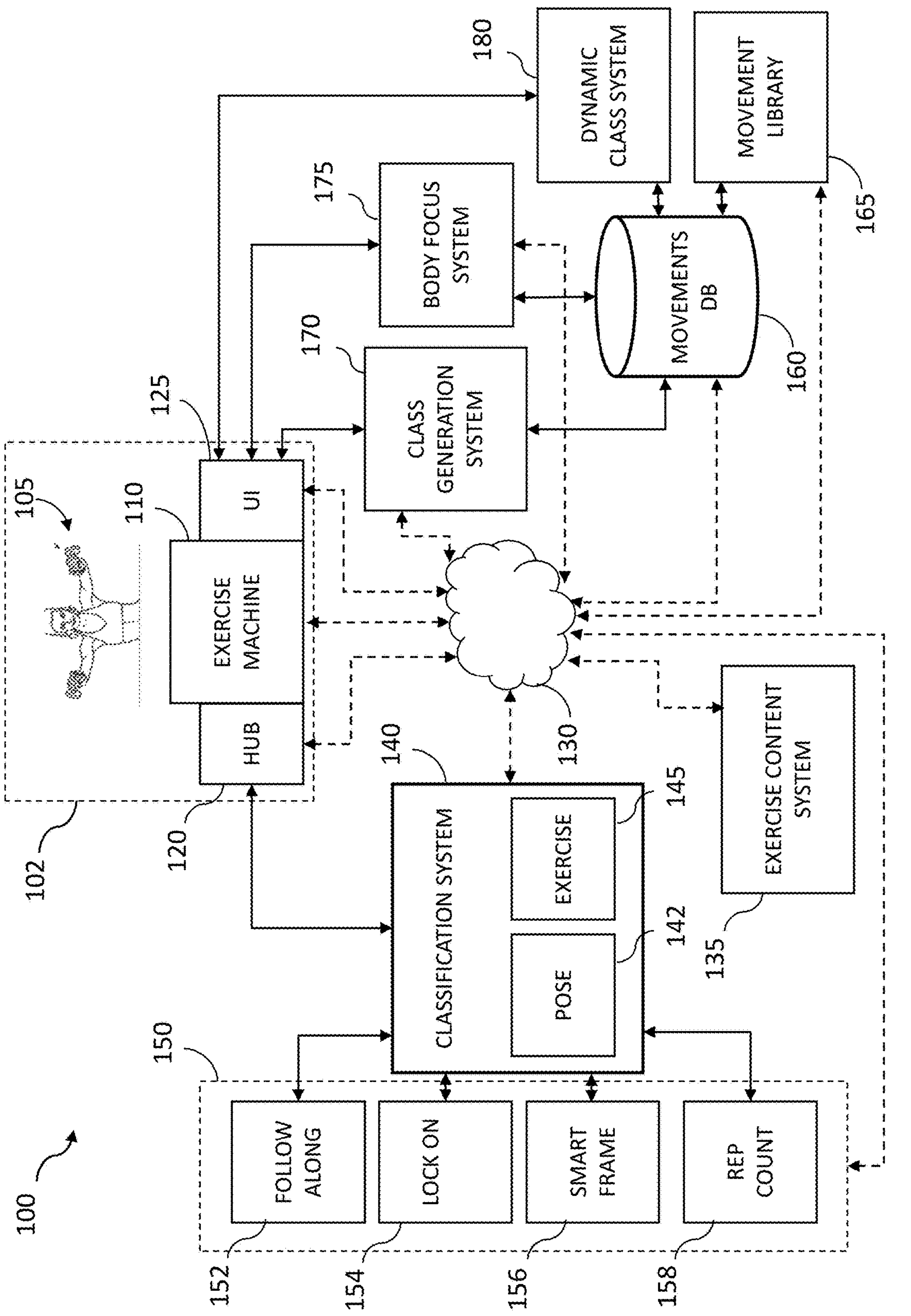
FIG. 1 is a block diagram illustrating a suitable network environment for users of an exercise system.

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

OVERVIEW

Various systems and methods that enhance an exercise or other physical activity performed by a user are described. In some embodiments, a classification system and/or a person detection system communicates with a media hub to receive images and perform various methods for classifying or detecting poses, exercises, and/or movements performed by a user during an activity. The media hub, as described herein, can include or be an activity recognition sensor embedded system, or include various activity recognition sensors.

In some embodiments, the systems and methods include a movements database (dB) that stores information as entries relating individual movements to data associated with the individual movements. Various systems, including class generation systems and body focus systems, can utilize the movements database when presenting class content to users and/or presenting exercise information (e.g., muscle groups worked or targeted) to the users.

Various embodiments of the system and methods will now be described. The following description provides specific details for a thorough understanding and an enabling description of these embodiments. One skilled in the art will understand, however, that these embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Examples of a Suitable Exercise Platform

The technology described herein is directed, in some embodiments, to providing a user with an enhanced user experience when performing an exercise or other physical activity, such as an exercise activity as part of a connected fitness system or other exercise system. FIG. 1 is a block diagram illustrating a suitable network environment 100 for users of an exercise system.

The network environment 100 includes an activity environment 102, where a user 105 is performing an exercise activity, such as a strength or lifting activity. In some cases, the user 105 can perform the activity with an exercise machine 110, such as a digital strength machine. An example strength machine can be found in co-pending PCT Application No. PCT/US22/22879, filed on Mar. 31, 2022, entitled CONNECTED FITNESS SYSTEMS AND METHODS, which is hereby incorporated by reference in its entirety.

The exercise activity performed by the user 105 can include a variety of different workouts, activities, actions, and/or movements, such as movements associated with stretching, doing yoga, lifting weights, rowing, running, cycling, jumping, dancing, sports movements (e.g., throwing a ball, pitching a ball, hitting, swinging a racket, swinging a golf club, kicking a ball, hitting a puck), and so on.

The exercise machine 110 can assist or facilitate the user 105 to perform the movements and/or can present interactive content to the user 105 when the user 105 performs the activity. For example, the exercise machine 110 can be a stationary bicycle, a stationary rower, a treadmill, a weight or strength machine, or other machines (e.g., weight stack machines). As another example, the exercise machine 110 can be a display device that presents content (e.g., classes, dynamically changing video, audio, video games, instructional content, and so on) to the user 105 during an activity or workout.

The exercise machine 110 includes a media hub 120 and a user interface 125. The media hub 120, in some cases, captures images and/or video of the user 105, such as images of the user 105 performing different movements, or poses, during an activity. The media hub 120 can include a camera or cameras (e.g., a RGB camera), a camera sensor or sensors, or other optical sensors (e.g., LIDAR or structure light sensors) configured to capture the images or video of the user 105.

In some cases, the media hub 120 can capture audio (e.g., voice commands) from the user 305. The media hub 320 can include a microphone or other audio capture devices, which captures the voice commands spoken by a user during a class or other activity. The media hub 120 can utilize the voice commands to control operation of the class (e.g., pause a class, go back in a class), to facilitate user interactions (e.g., a user can vocally "high five" another user), and so on.

In some cases, the media hub 120 includes components configured to present or display information to the user 105. For example, the media hub 120 can be part of a set-top box or other similar device that outputs signals to a display (e.g., television, laptop, tablet, mobile device, and so on), such as the user interface 125. Thus, the media hub 120 can operate to both capture images of the user 105 during an activity, while also presenting content (e.g., streamed classes, workout statistics, and so on) to the user 105 during the activity. Further details regarding a suitable media hub can be found in U.S. application Ser. No. 17/497,848, filed on Oct. 8, 2021, entitled MEDIA PLATFORM FOR EXERCISE SYSTEMS AND METHODS, which is hereby incorporated by reference in their entirety.

The user interface 125 provides the user 105 with an interactive experience during the activity. For example, the user interface 125 can present user-selectable options that identify live classes available to the user 105, pre-recorded classes available to the user 105, historical activity information for the user 105, progress information for the user 105, instructional or tutorial information for the user 105, and other content (e.g., video, audio, images, text, and so on), that is associated with the user 105 and/or activities performed (or to be performed) by the user 105.

The exercise machine 110, the media hub 120, and/or the user interface 125 can send or receive information over a network 130, such as a wireless network. Thus, in some cases, the user interface 125 is a display device (e.g., attached to the exercise machine 110), that receives content from (and sends information, such as user selections) an exercise content system 135 over the network 130. In other cases, the media hub 120 controls the communication of content to/from the exercise content system 135 over the network 130 and presents the content to the user via the user interface 125.

The exercise content system 135, located at one or more servers remote from the user 105, can include various content libraries (e.g., classes, movements, tutorials, and so on) and perform functions to stream or otherwise send content to the machine 110, the media hub 120, and/or the user interface 125 over the network 130.

In addition to a machine-mounted display, the display device 125, in some embodiments, can be a mobile device associated with the user 105. Thus, when the user 105 is performing activities outside of the activity environment 102 (such as running, climbing, and so on), a mobile device (e.g., smart phone, smart watch, or other wearable device), can present content to the user 105 and/or otherwise provide the interactive experience during the activities.

In some embodiments, a classification system 140 communicates with the media hub 120 to receive images and perform various methods for classifying or detecting poses and/or exercises performed by the user 105 during an activity. The classification system 140 can be remote from the media hub 120 (as shown in FIG. 1) or can be part of the media hub 120 (e.g., contained by the media hub 120).

The classification system 140 can include a pose detection system 142 that detects, identifies, and/or classifies poses performed by the user 105 and depicted in one or more images captured by the media hub 120. Further, the classification system 140 can include an exercise detection system 145 that detects, identifies, and/or classifies exercises or movements performed by the user 105 and depicted in the one or more images captured by the media hub 120.

Various systems, applications, and/or user services 150 provided to the user 105 can utilize or implement the output of the classification system 140, such as pose and/or exercise classification information. For example, a follow along system 152 can utilize the classification information to determine whether the user 105 is "following along" or otherwise performing an activity being presented to the user 105 (e.g., via the user interface 125).

As another example, a lock on system 154 can utilize the person detection information and the classification information to determine which user, in a group of users, to follow or track during an activity. The lock on system 154 can identify certain gestures performed by the user and classified by the classification system 140 when determining or selecting the user to track or monitor during the activity.

Further, a smart framing system 156, which tracks the movement of the user 105 and maintains the user in a certain frame over time, can utilize the person detection information when tracking and/or framing the user.

Also, a repetition counting system 158 (e.g., "rep counting system") can utilize the classification or matching techniques to determine a number of repetitions of a given movement or exercise are performed by the user 105 during a class, another presented experience, or when the user 105 is performing an activity without participation in a class or experience.

Of course, other systems can also utilize pose or exercise classification information when tracking users and/or analyzing user movements or activities. Further details regarding the classification system 140 and various systems (e.g., the follow along system 152, the lock on system 154, the smart framing system 156, the repetition counting system 150, and so on) are described herein.

In some embodiments, the systems and methods include a movements database (dB) 160. The movements database 160, which can reside on a content management system (CMS) or other system associated with the exercise platform (e.g., the exercise content system 135), can be a data structure that stores information as entries that relate individual movements to data associated with the individual movements. As is described herein, a movement is a unit of a workout or activity, and in some cases, the smallest unit of the workout or activity (e.g., an atomic unit for a workout or activity). Example movements include a push-up, a jumping jack, a bicep curl, an overhead press, a yoga pose, a dance step, a stretch, and so on.

The movements database 160 can include, or be associated with, a movement library 165. The movement library 165 includes short videos (e.g., GIFs) and long videos (e.g., ~90 seconds or longer) of movements, exercises, activities, and so on. Thus, in one example, the movements database 160 can relate a movement to a video or GIF within the movement library 165.

Various systems and applications can utilize information stored by the movements database 160. For example, a class generation system 170 can utilize information from the movements database 160 when generating, selecting, and/or recommending classes for the user 105, such as classes that target specific muscle groups.

As another example, a body focus system 175 can utilize information stored by the movements database 160 when presenting information to the user 105 that identifies how a certain class or activity strengthens or works the muscles of their body. The body focus system 175 can present interactive content that highlights certain muscle groups, displays changes to muscle groups over time, tracks the progress of the user 105, and so on.

Further, a dynamic class system 180 can utilize information stored by the movements database 160 when dynamically generating a class or classes (or generating one or more class recommendations) for the user 105. For example, the dynamic class system 180 can access information for the user 105 from the body focus system 175 and determine one or more muscles to target in a new class for the user 105. The system 180 can access the movements database 160 using movements associated with the targeted muscles and dynamically generate a new class (or recommend one or more existing classes) for the user that incorporates videos and other content identified by the database 160 as being associated with the movements.

Of course, other systems or user services can utilize information stored in the movements database 160 when generating, selecting, or otherwise providing content to the user 105. Further details regarding the movements database 160 and various systems (e.g., the class generation system 170, the body focus system 175, the dynamic class system 180, and so on) will be described herein.

FIG. 1 and the components, systems, servers, and devices depicted herein provide a general computing environment and network within which the technology described herein can be implemented. Further, the systems, methods, and techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical discs, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The network or cloud 130 can be any network, ranging from a wired or wireless local area network (LAN), to a wired or wireless wide area network (WAN), to the Internet or some other public or private network, to a cellular (e.g., 4G, LTE, or 5G network), and so on. While the connections between the various devices and the network 130 and are shown as separate connections, these connections can be any kind of local, wide area, wired, or wireless network, public or private.

Further, any or all components depicted in the Figures described herein can be supported and/or implemented via one or more computing systems or servers. Although not required, aspects of the various components or systems are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices, wearable devices, or mobile devices (e.g., smart phones, tablets, laptops, smart watches), all manner of cellular or mobile phones, multi-processor systems, microprocessor-based or programmable consumer electronics, set-top boxes, network PCs, mini-computers, mainframe computers, AR/VR devices, gaming devices, and the like. Indeed, the terms "computer," "host," and "host computer," and "mobile device" and "handset" are generally used interchangeably herein and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), or they may be provided on any analog or digital network (packet switched, circuit switched, or other scheme). Portions of the system may reside on a server computer, while corresponding portions may reside on a client computer such as an exercise machine, display device, or mobile or portable device, and thus, while certain hardware platforms are described herein, aspects of the system are equally applicable to nodes on a network. In some cases, the mobile device or portable device may represent the server portion, while the server may represent the client portion.

Examples of the Classification System and Associated Systems

Figure 2:
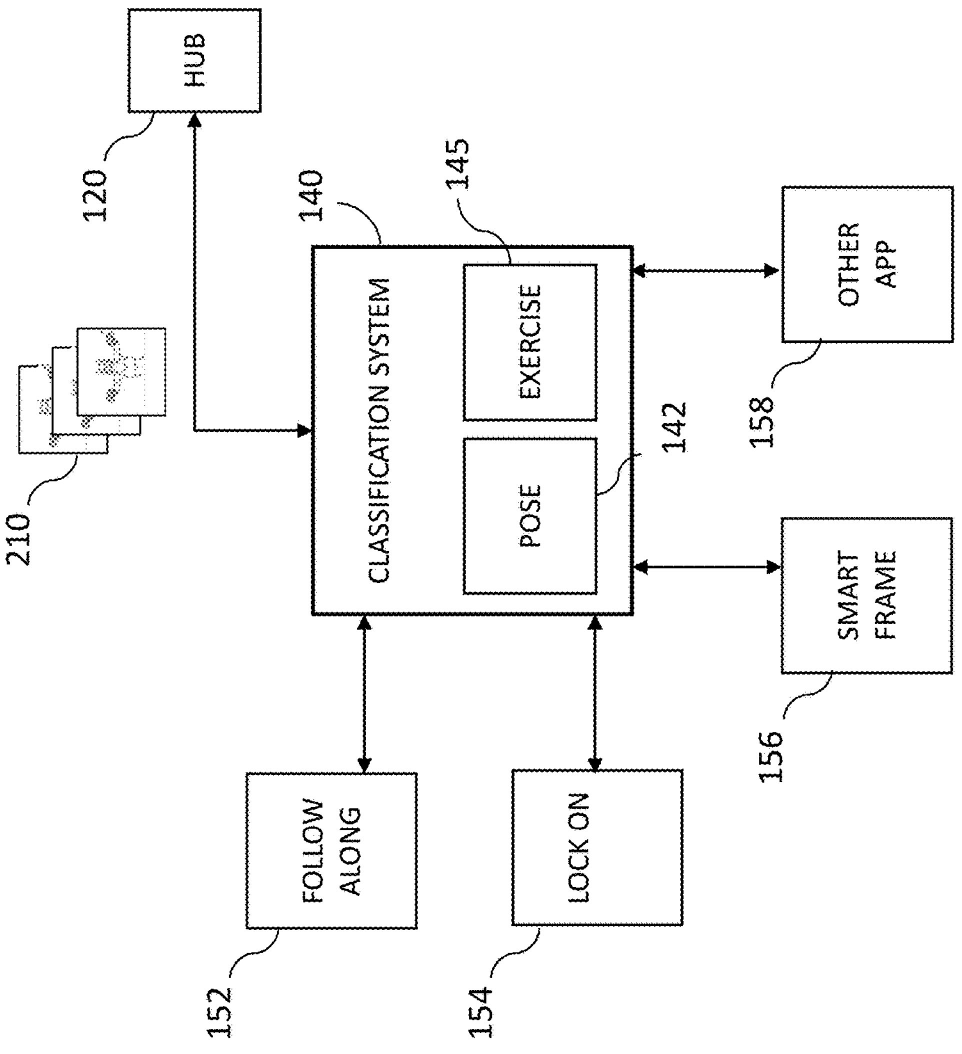
FIG. 2 is a block diagram illustrating a classification system for an exercise platform.

As described herein, in some embodiments, the classification system 140 communicates with the media hub 120 to receive images and perform various method for classifying or detecting poses and/or exercises performed by the user 105 during an activity. FIG. 2 depicts interactions between the classification system 140 and other systems or devices of an exercise platform or connected fitness environment.

The classification system 140 receives images 210 from the media hub 120. The images 210 depict the user 105 in various poses, movements, or exercises during an activity. For example, the poses can include standing poses, sitting poses, squatting poses, arms extended, arms overhead, yoga poses, cycling poses, running poses, rowing poses, strength poses, sports poses, dance poses, and so on. Similarly, the exercises can include standing exercises, sitting exercises, squatting exercises, strength exercises (e.g., lifting movements with arms extended, arms overhead, and so on), yoga exercises, cycling exercises, running exercises, rowing exercises, sports exercises (e.g., throwing or kicking movements, and so on. The exercises can include one or more movements, such as a single movement or a combination of movements.

Further, the poses or exercises can include non-activity movements (or movements not associated with the activity), such as poses or movements associated with a user resting (e.g., sitting or leaning), walking, drinking water, or otherwise non engaged with the activity (e.g., talking a short break or rest).

The classification system 140, using the images 210, can perform various techniques, such as machine learning (ML) or computer vision (CV) techniques, for detecting and/or classifying a pose, movement, or an exercise from an image or set of images. The system 140 can perform these techniques separately, or combine various techniques to achieve certain results, such as results that classify poses and provide accurate inferences or predictions to other systems, such as the follow along system 152 and/or the repetition counting system 158. The following frameworks illustrate operations performed by the classification system 140 when detecting and/or classifying poses, movements, or exercises within images captured by the system.

Examples of Pose Classification Frameworks

As described herein, the classification system 140 includes the pose detection system 142, which detects, identifies, and/or classifies poses performed by the user 105 that are depicted in the images 210 captured by the media hub 120.

Figure 3:
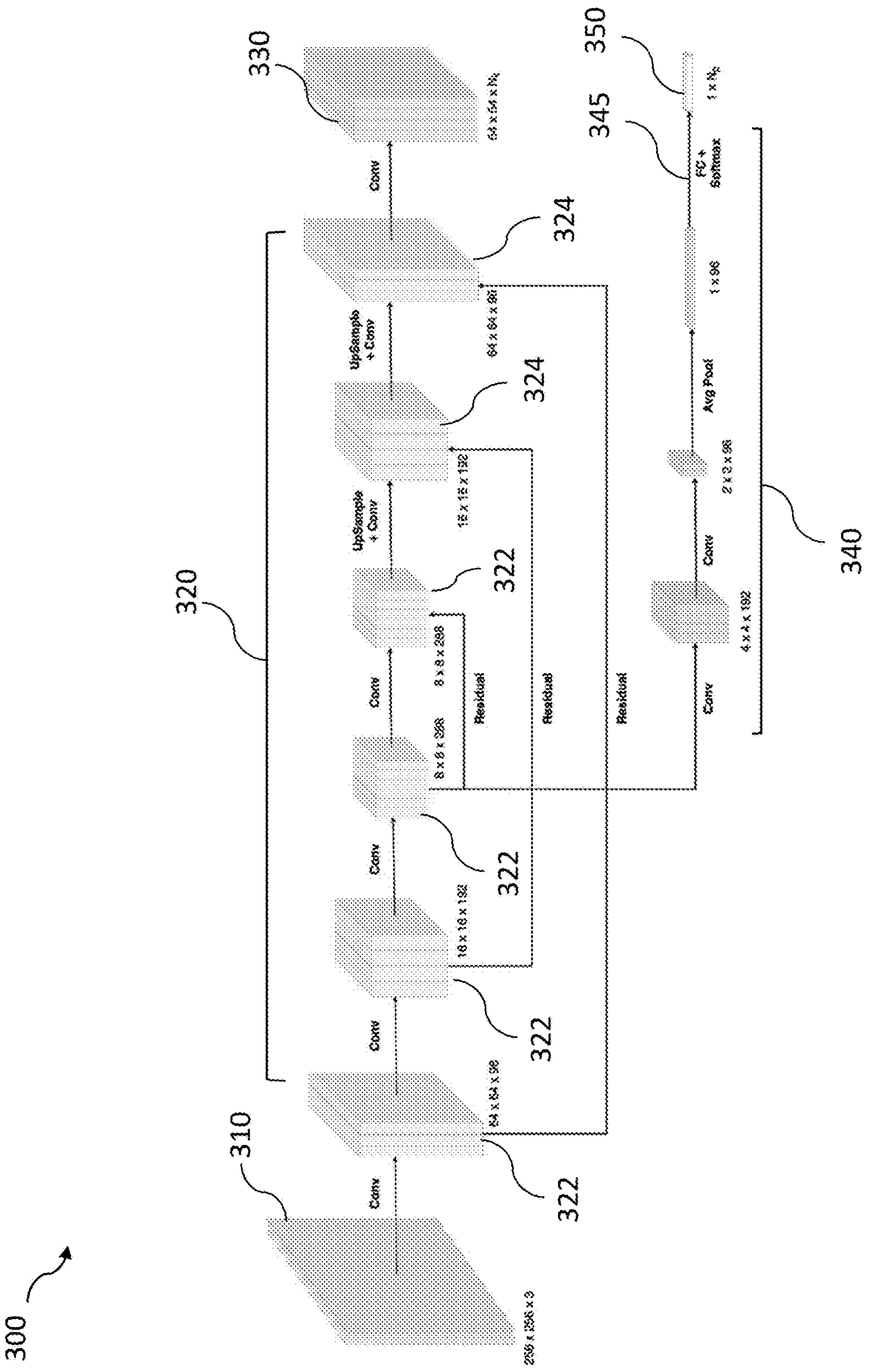
FIG. 3 is a diagram illustrating a neural network for detecting a pose of a user during an activity.

The pose detection system 142, in some embodiments, employs a DeepPose classification technique. FIG. 3 is a diagram illustrating a neural network 300 for detecting a pose of a user during an activity. DeepPose is a deep neural network that extends a top-down keypoint detector for pose classification, and thus performs both keypoint detection and pose classification.

The neural network 300 receives an image 310 and utilizes a U-Net style keypoint detector 320 (or other convolutional neural network), which processes a crop of the user 105 in the image 310 through a series of downsampling or encoding layers 322 and upsampling or decoding layers 324 to predict a keypoint heatmap 330, or feature map, for the image 310. The keypoint detector 320, in some cases, identifies keypoints, or interest points, of a user with the image 310.

Additional DeepPose layers 340 receive the feature map 330 generated by the keypoint detector 320 (at the end of the downsampling layers), perform additional downsampling, and pass the feature map 330 through a fully connected layer 345 with Softmax (e.g., a function that converts a vector of numbers into a vector of probabilities), which detects and classifies the pose depicted in the image 310, providing a classification 350 of the pose within the image 310. In some cases, the classification system 142 performs a series of photometric, translational, rotational, and/or mirroring augmentations on the input images 310 to ensure the neural network 300 is robust.

In some embodiments, the pose detection system 142 employs a bottom-up pose classifier, such as a CenterPose classification technique. The CenterPose classification technique is based on an object detector framework, such as the CenterNet framework, which is a bounding box-based detector that operates to identify objects as axis-aligned boxes in an image.

Figure 4:
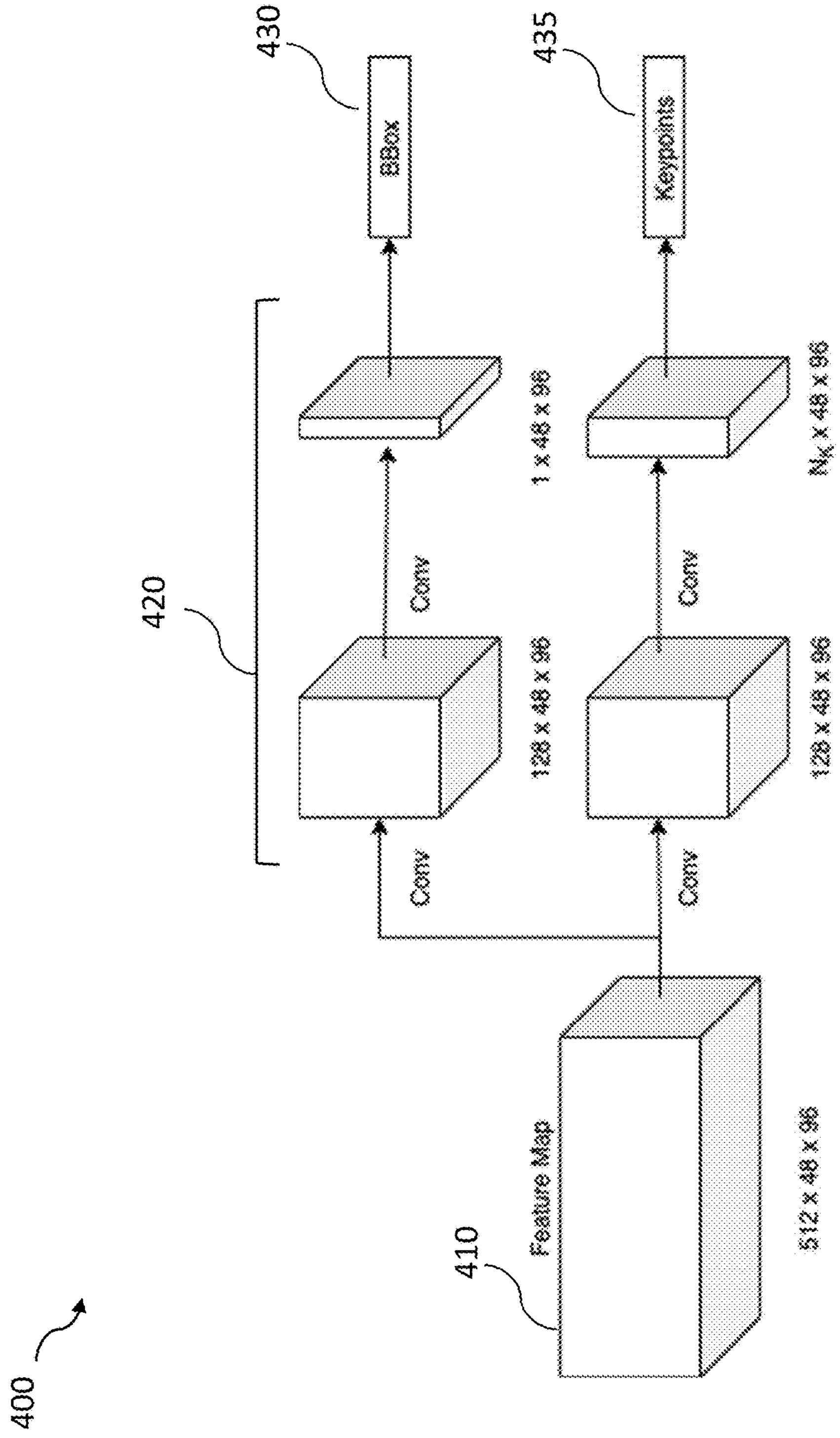
FIGS. 4-6 are diagrams illustrating a bottom-up pose classifier for classifying a pose of a user during an activity.
Figure 5:
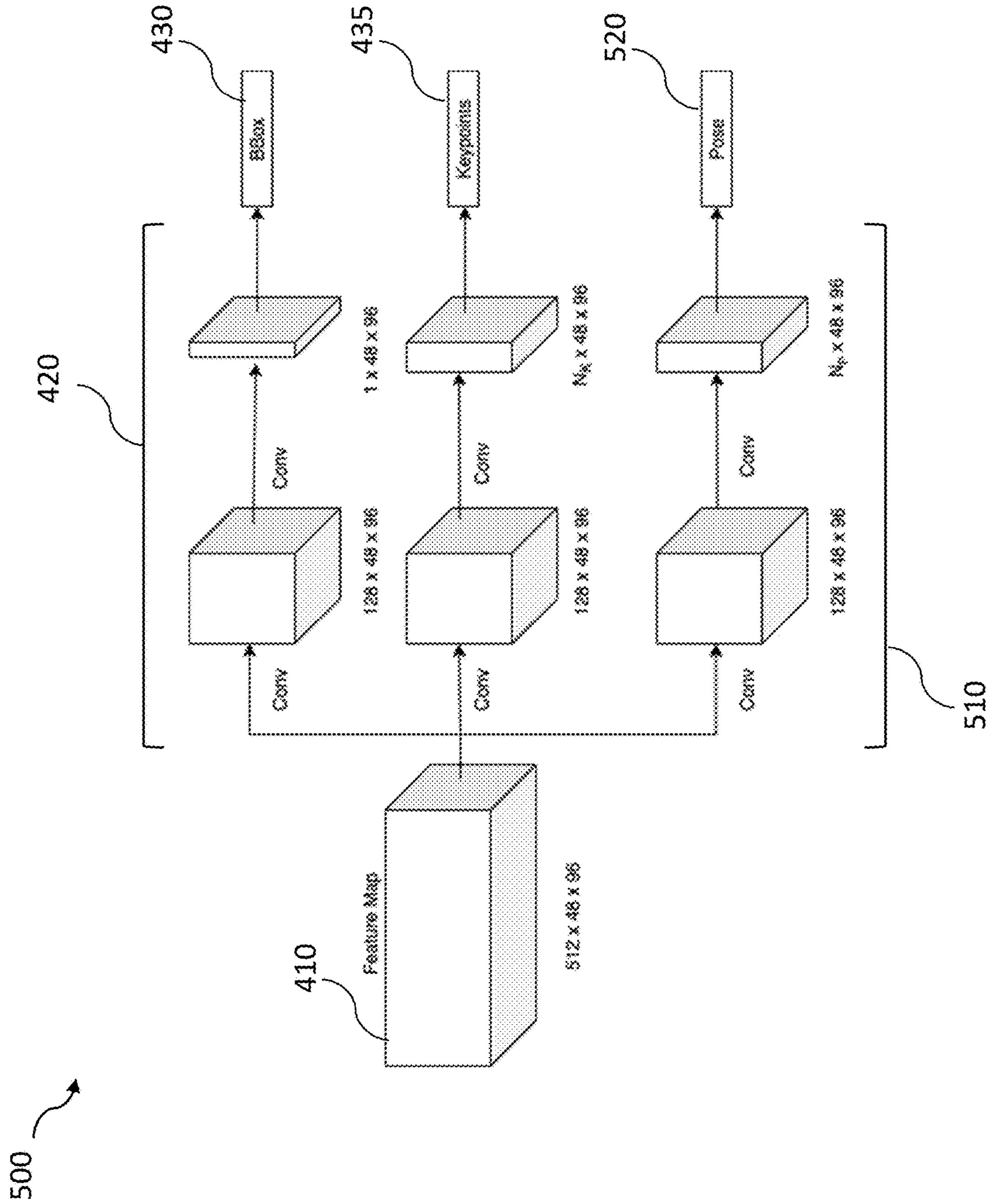
Figure 6:
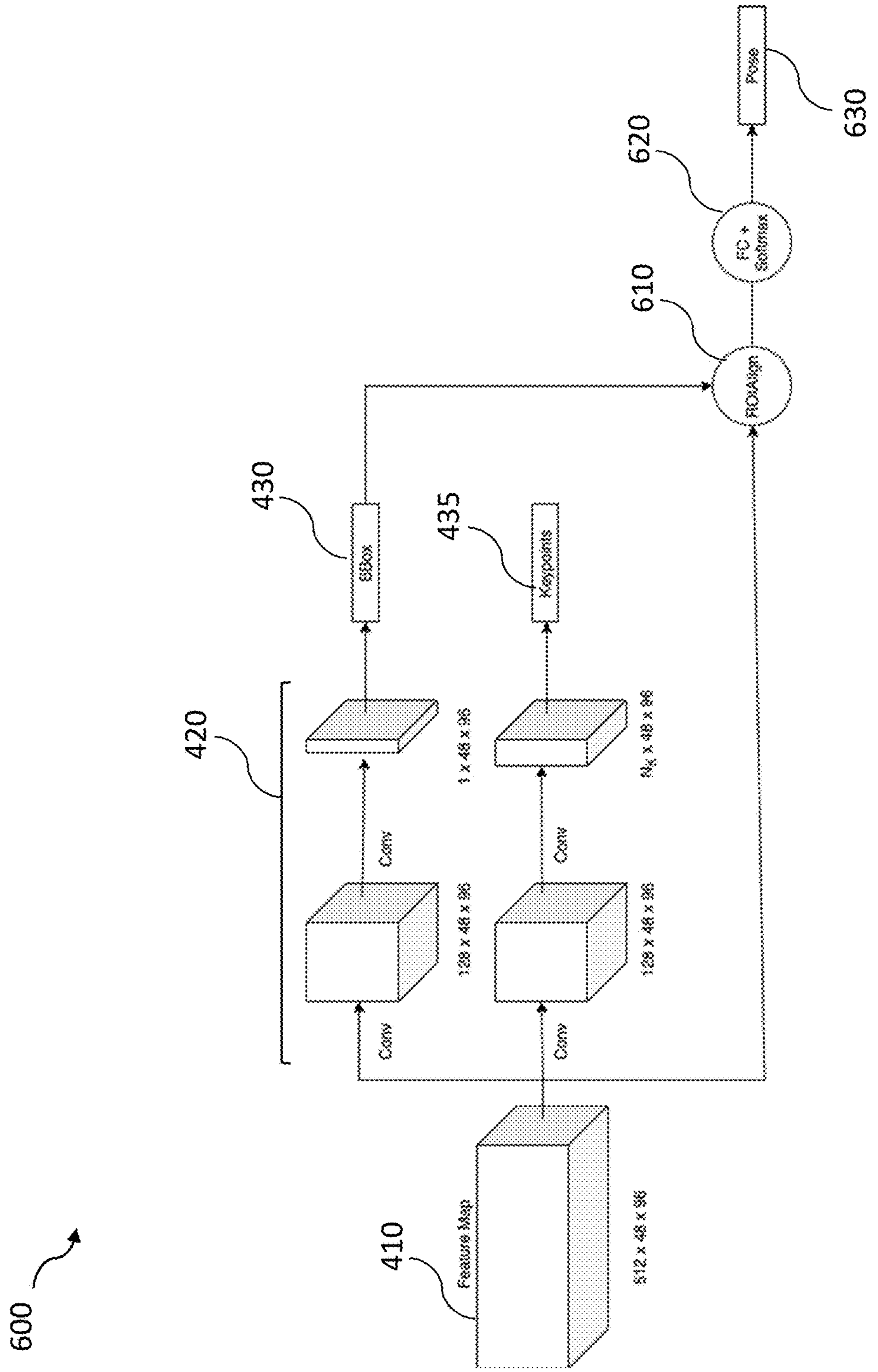

FIGS. 4-6 are diagrams illustrating a bottom-up pose classifier for classifying a pose of a user during an activity. The bottom-up classifier can perform simultaneous person detection, keypoint detection, and pose classification.

FIG. 4 depicts the underlying object detection architecture, model, or framework 400. The framework 400 receives an image, or feature map 410, as input. Various downsampling or encoding layers 420 convert the feature map 410, resulting in two downsampled heatmaps, a BBox heatmap 430 and a Keypoints heatmap 435. The BBox heatmap 430 includes peaks that correspond to the center of each person in the image, and the Keypoints heatmap 435 includes channel-wise peaks to the center of each keypoint. In some cases, the framework 400 includes additional regression heads (not shown) that can predict the width and height of the person box and keypoint offsets of the heatmaps 430, 435.

FIG. 5 depicts a model or framework 500 that includes the addition of an additional head 510 to the framework 400 of FIG. 4. The additional head 510 generates, via additional downsampling or encoding layers, a pose heatmap 520 having channel-wise peaks that correspond to a pose the user 105 is currently performing (depicted in the feature map 410 of the image).

The pose heatmap 520 can have dimensions $N_r$×48×96, where $N_r$ is a set of available poses to be classified (e.g., the set of all available or possible poses). While the other heads can use a Sigmoid (e.g., or squashing function), the head 510 can utilize a Softmax function or layer (as described herein), in order to identify only one pose for each localized user. In some cases, when the peaks of the pose and user (or person) heatmaps do not exactly align, the framework 500 can associate each pose peak with a closest person, or use, peak.

FIG. 6 depicts a model or framework 600 that includes an ROIAlign (Region of Interest Align) operation to extract a small feature map from the BBox heatmap 430. The framework 600 utilizes a ROIAlign operation 610 with the person bounding boxes (BBox heatmap 430) on the image feature map to create person-localized feature maps, which are provided to additional downsampling and Fully Connected+Softmax layers 620 to predict or output a pose or pose heatmap 630.

In addition to the frameworks 500 and 600, the pose classification system 142 can utilize other classification techniques. For example, the system 142 can employ classical classifiers, like XGBoost, on keypoints from a keypoint detector to classify poses within images. In some cases, the system 142 can normalize the keypoint coordinates by the frame dimensions to be in the 0-1 range before passing them to the classifier for classification.

In some cases, the pose classification system 142 can perform hierarchical classification of poses. For example, poses can have multiple variations (e.g., a pose of "Bicep Curl" can be done either sitting, standing, or kneeling, and either just on the left side, just right, or alternating). The frameworks 500, 600 can model or learn these variational relationships by incorporating a hierarchy of poses in the model training loss, where pose predictions that are closer to a ground truth in the hierarchy are penalized less than those further away.

Examples of Exercise Classification Frameworks

As described herein, the classification system 140 includes the exercise detection system 145, which detects, identifies, and/or classifies exercises performed by the user 105 that are depicted in the images 210 captured by the media hub 120.

The exercise detection system 145, in some embodiments, employs a set of action recognition techniques to identify an exercise that a person (e.g., the user 105) is performing within a set of images or video stream, such as the images 210. The action recognition techniques can be called "DeepMove," and utilize various ML/CV models or frameworks, such as the neural network framework 300 of FIG. 3, which utilizes keypoint detection techniques.

Figure 7A:
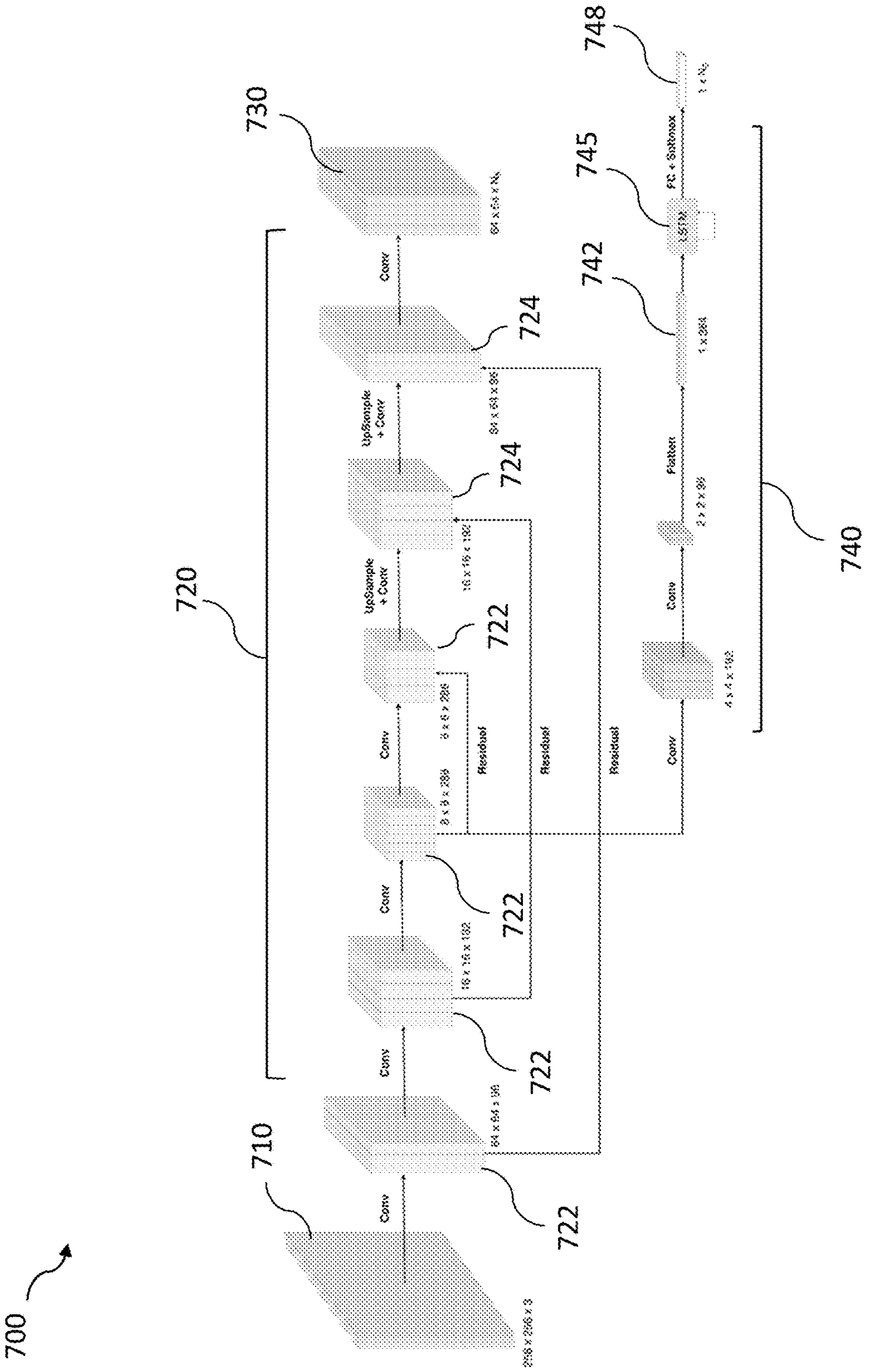
FIGS. 7A-9 are diagrams illustrating an exercise classification system for classifying an exercise being performed by a user.

FIG. 7A depicts a framework 700 that utilizes keypoint detection techniques to classify an exercise in a sequence of images 710. The images 710, or feature map, are fed into a keypoint detector 720, where a series of downsampling (encoding) layers 722 and upsampling (decoding) layers 724 generate a predicted keypoint heatmap 730. The heatmap 730 is flattened via additional downsampling layers 740 into a context vector 742, which is fed into an LSTM (Long short-term memory) layer 745, which applies deep learning artificial recurrent neural network (RNN) modeling to the context vector 742. The LSTM layer 745, via the applied techniques, outputs an exercise classification 748 for the exercise depicted in the images 710.

Figure 7B:
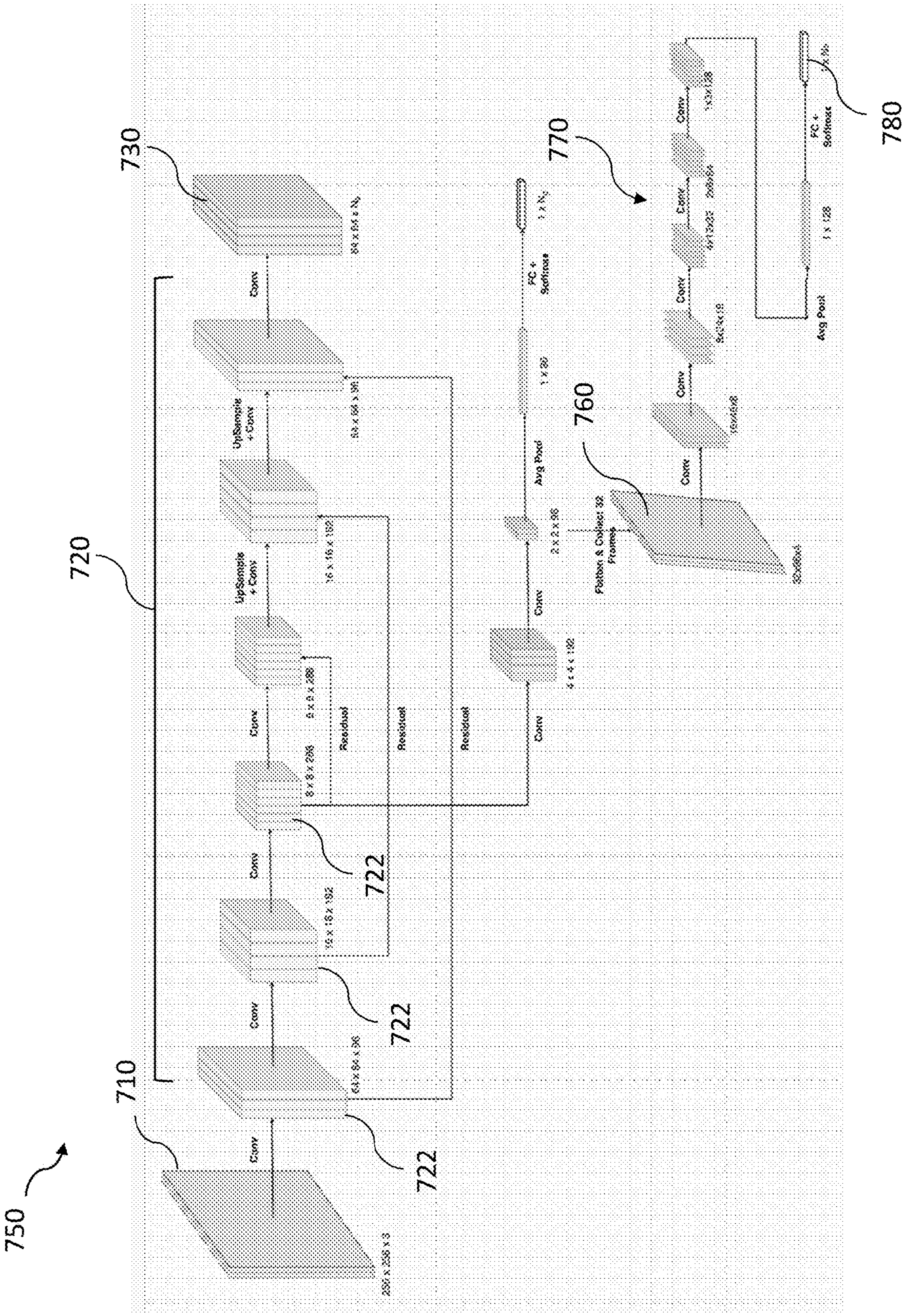

FIG. 7B depicts a framework 750 that utilizes a series of convolution techniques to classify an exercise in a sequence of images 710. The framework 750 includes a 3D-CNN (three-dimensional convolution neural network) architecture or model that collects the feature maps across a fixed time window (16/32 frames) 760, collates them, and passes them through a series of convolution (Conv) layers 770 to obtain an exercise classification for the exercise depicted in the images 710.

FIG. 8 depicts a framework 800 that utilizes a TSM (temporal shift module) architecture or model to perform edge exercise predictions to classify an exercise in a sequence of images 810. The framework 800 uses a MobileNetV2 backend that is pre-trained on generic action recognition datasets such as Kinetics, UCF, and so on. Once pre-trained, the backend can be tuned to predict and classify exercises 820 within the platform dataset of available or possible exercises.

The TSM is embedded within the MobileNetV2 backbone and includes shift buffers 815 that shift ⅛ of the feature maps+/−1 frame into the past and the future to exchange temporal information. The TSM is trained on clip lengths of 8 frames, representing a temporal window ranging from 1.6-4.8 seconds.

Figure 8A:
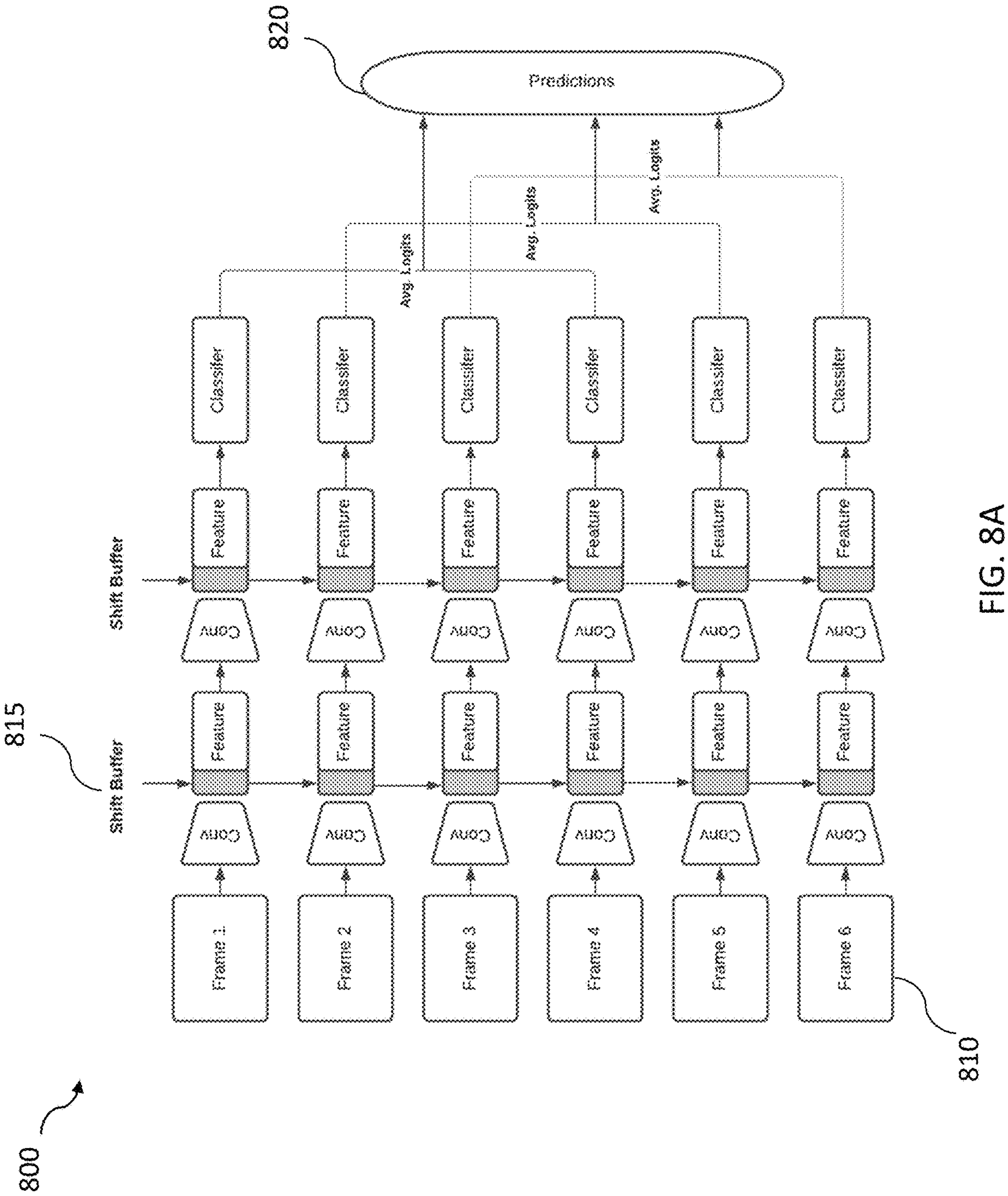
Figure 8B:
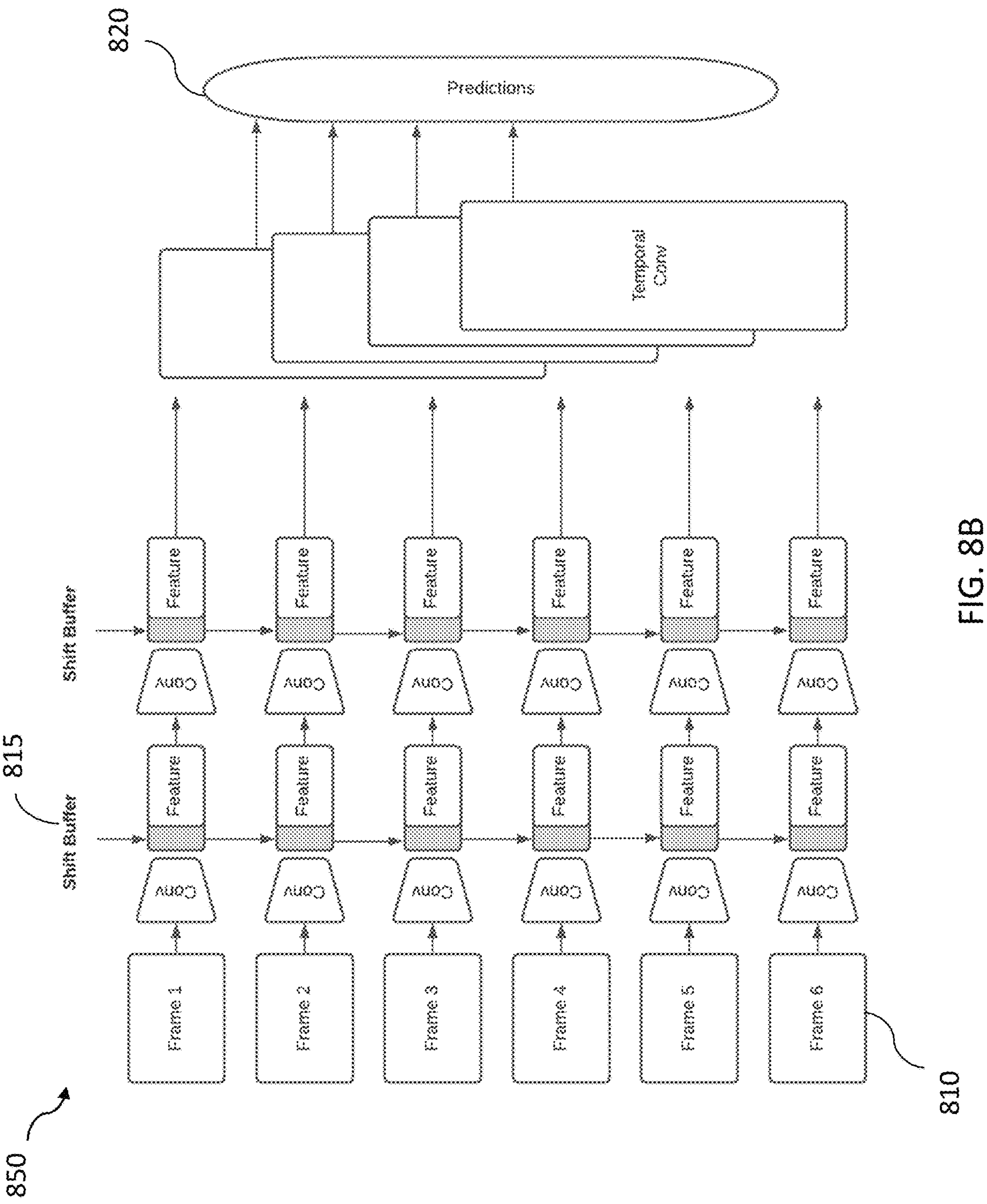

FIG. 8B depicts a framework 850 that includes a TSM combined with a 3DCNN head that utilizes the TSM shift buffer 815 described in FIG. 8A in combination with aspects of the 3DCNN framework 750 as described in FIG. 7B. This model utilizes a sequence of 16 frames to exchange temporal information and classify an exercise per frame without the complexity of a 3D convolution.

In some cases, the TSM predicts and/or classifies non-activities. For example, the framework 800 or framework 850 can include an additional classification head that outputs a prediction of "exercising" or "non exercising", optionally using a multi-modal input conditioned on a current class context. For example, the current class context can be represented via a "content vector," which predicts the probability an individual is exercising given current contextual cues from associated content (e.g., a class being presented to the user). The content vector is concatenated with the TSM feature map representing a sequence of frames and passed through a fully connected layer to predict an exercising/not exercising probability.

Figure 9:
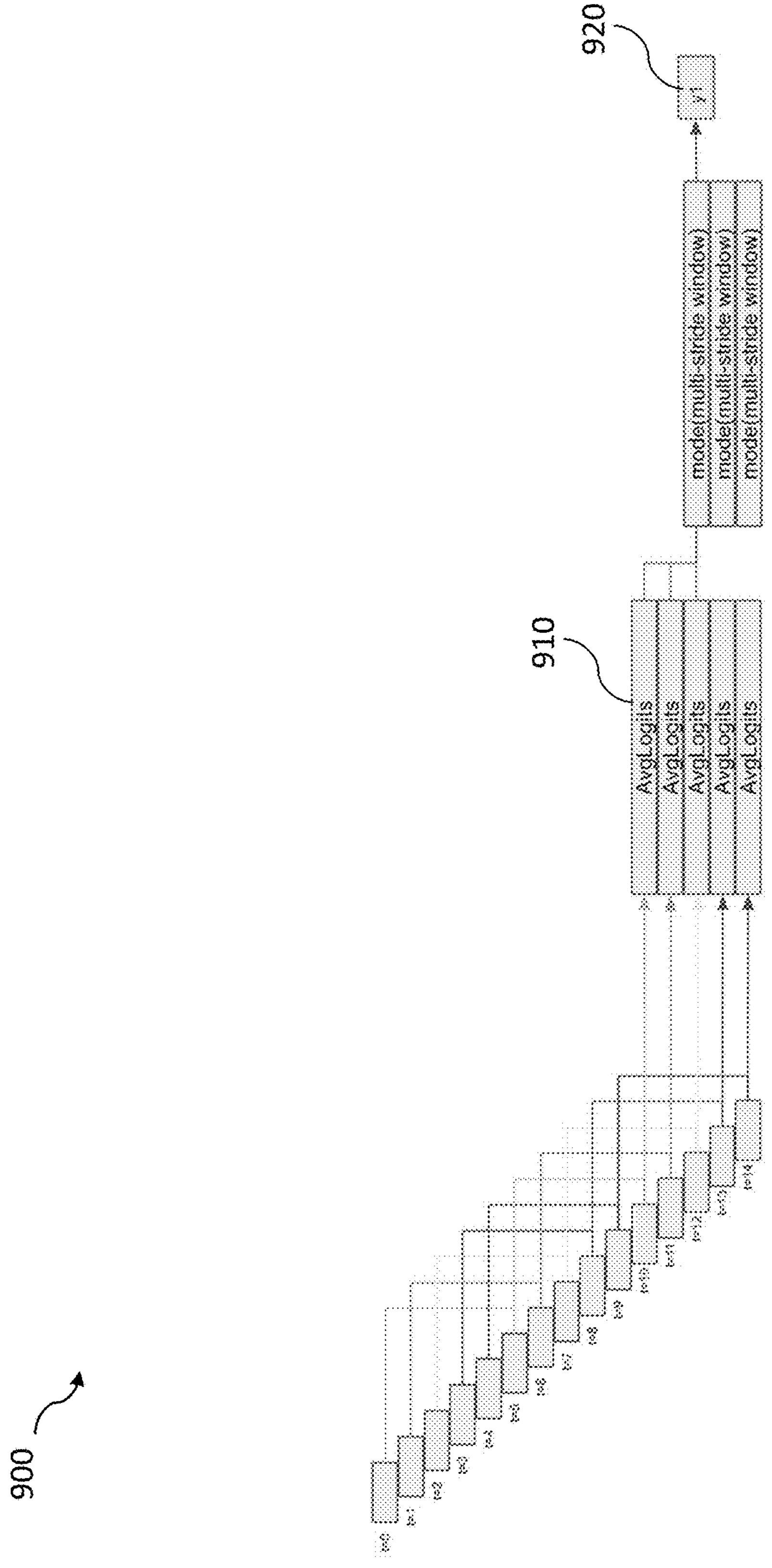

FIG. 9 depicts a striding logic framework 900, which, in association with the TSM framework 800, facilitates a robust real-time classification of exercises within a video stream. The logic framework 900 collects and averages classifier logits 910 over S frames (e.g., striding). The framework 900 classifies the mode of the argmax of the logits 910 to get a final exercise prediction or classification 920.

Examples of Matching Based Methods

In some embodiments, the classification system 140, employs match recognition techniques to identify a pose that a person (e.g., the user 105) is performing within a set of images or video stream, such as the images 210. The action recognition techniques can be called "DeepMatch," and utilize various metric learning techniques to classify poses depicted in images.

Figure 10:
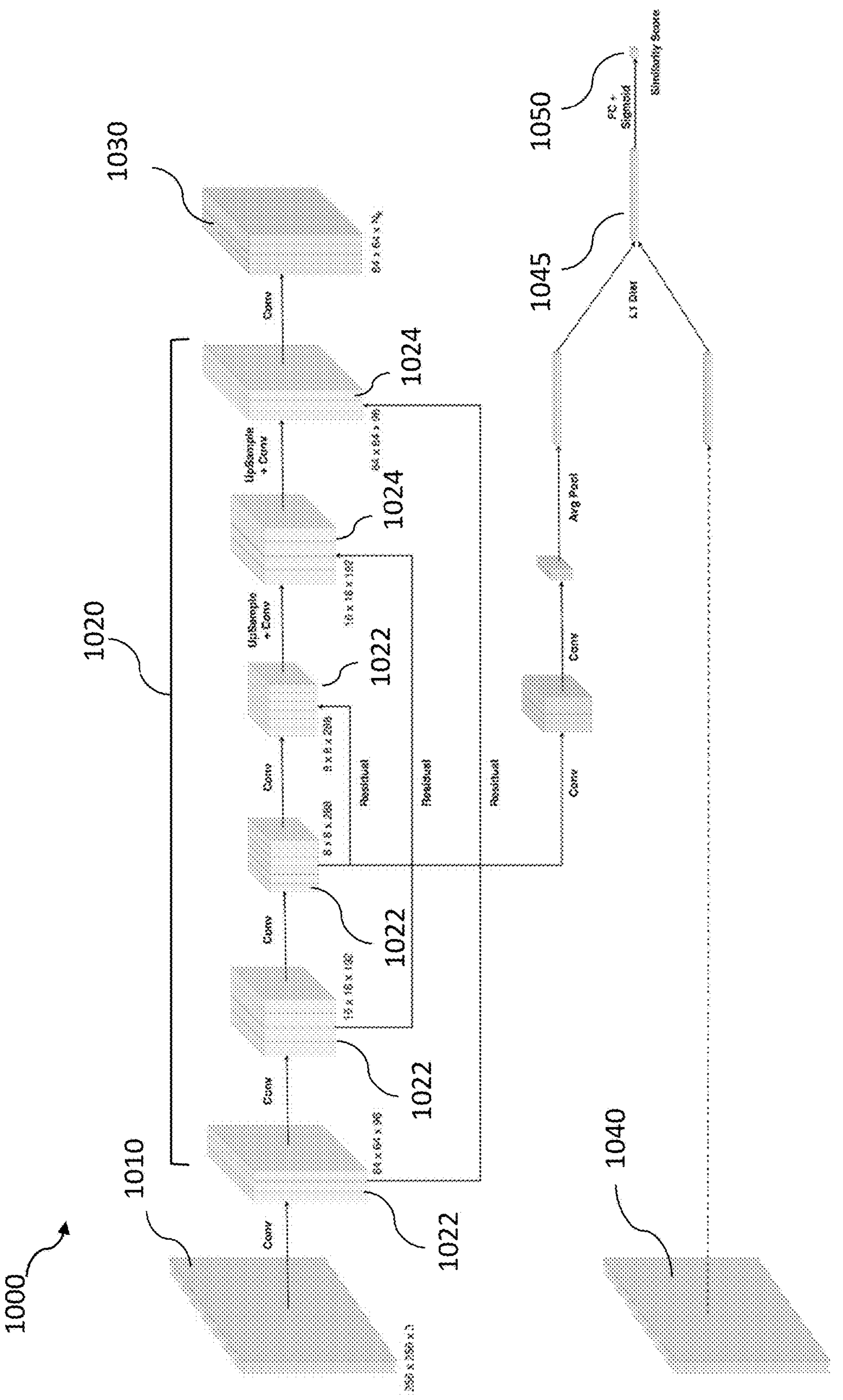
FIG. 10 is a diagram illustrating a match-based approach for classifying a pose of a user during an activity.

FIG. 10 depicts a match-based framework 1000 for classifying a pose or exercise of a user during an activity. The framework 1000 can include a Few-Shot Learning approach, where metric learning (e.g., a Siamese or Triplet Network learning) trains a network (e.g., a network that is optionally pre-trained for keypoint detection), to generate similar embeddings for images of people or users in similar poses.

The framework 1000 performs a person detector technique on an image 1010 to obtain the crop of a person, and then pass the crop to the network 1000. In some cases, the network is pre-trained on keypoint detection so that there is distilled knowledge about the human anatomy within the network 1000. Similar to the framework 700, the images 1010 (or cropped images) are fed into a keypoint detector 1020, where a series of downsampling layers 1022 and upsampling layers 1024 generate a predicted keypoint heatmap 1030.

The framework 1000 can utilize a manually curated group of poses for positive and negative samples. For example, the framework 1000 can utilize a hybrid approach that trains a classic Siamese network in an episodic manner (e.g., few-shot classification).

The framework 1000 includes a set of template embeddings 1040, which represent all possible poses of an exercise. Using a video stream or images 1000 of a person exercising, the framework generates an embedding, or the keypoint heatmap 1030, of the exercise in successive frames, and match 1045 the embedding 1030 to the template embeddings 1040 to determine a similarity score 1050 for the images 1000. For example, if the similarity score 1050 exceeds a match threshold score, the matched template pose is predicted to be the pose within the images 1010.

Thus, the framework 1000 can match captured images of users in poses, compare the images (or, crops of images) to a set of template images, and determine, identify, predict, or classify poses within the images based on the comparisons (e.g., identifying best or threshold matches images).

Examples of Combined Classification and Matching Techniques

In some embodiments, the different techniques described herein are combined logically to improve or enhance the accuracy of the inferences output by the different frameworks. For example, a combination system that applies a technique that combines a classification framework (e.g., DeepMove) with a matching framework (e.g., DeepMatch) can provide a higher accuracy of outputs for the various systems (e.g., the follow along system 152 or the repetition counting system 158).

The combination technique (e.g., "Ensemble"), combines the DeepMove and DeepMatch techniques to recognize the exercises or movements performed by a user. For example, when DeepMove predicts a certain exercise with a given threshold confidence, an associated system assumes the user is performing the exercise (e.g., following along). However, when DeepMove outputs a prediction below a threshold confidence level but does output an indication that the user is not performing an exercise (e.g., not following along) above the threshold confidence level, the associated system assumes the user is not performing the exercise.

Figure 11:
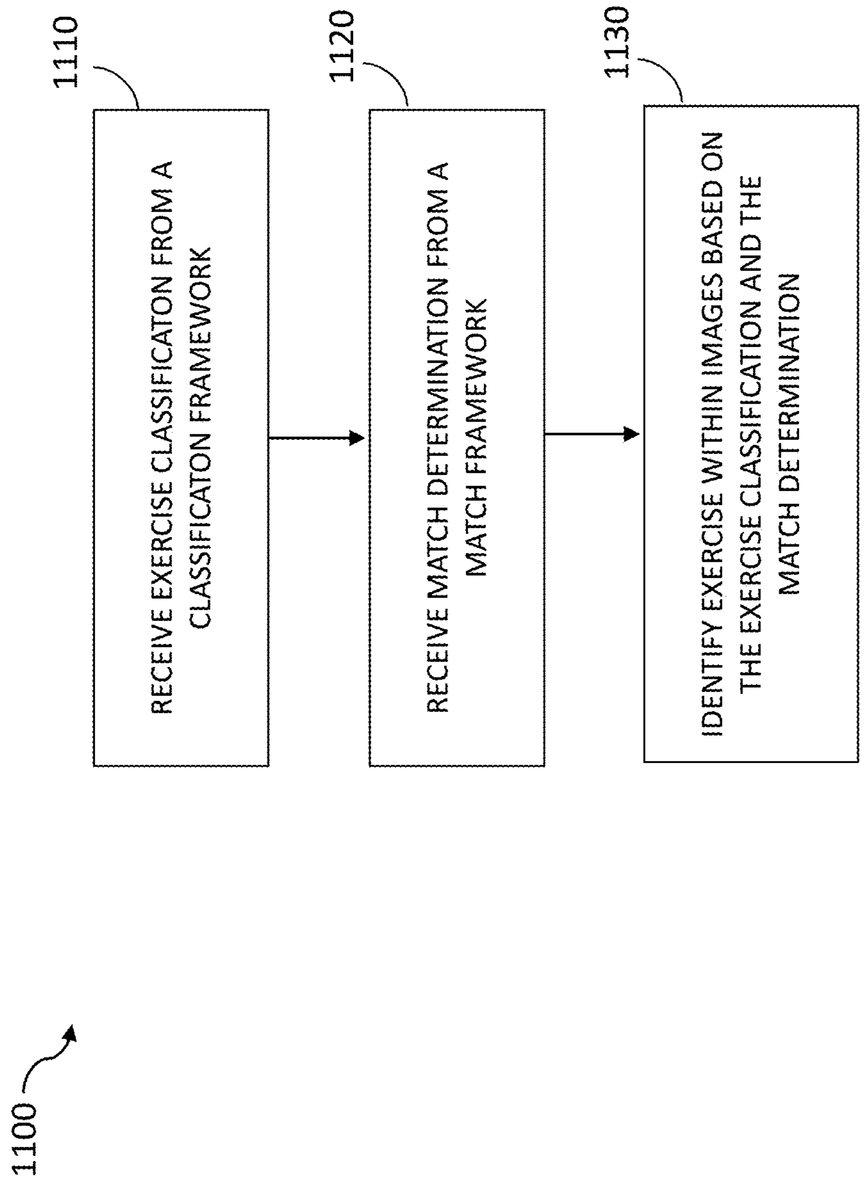
FIG. 11 is a flow diagram illustrating an example method for determining an exercise performed by a user.

As described herein, the technology can incorporate information (e.g., predictions) from different frameworks when determining whether a user is performing an exercise, pose, movement, and so on. FIG. 11 is a flow diagram illustrating an example method 1100 for determining an exercise performed by a user. The method 1100 may be performed by the combination system and, accordingly, is described herein merely by way of reference thereto. It will be appreciated that the method 1100 may be performed on any suitable hardware or by the various systems described herein.

In operation 1110, the combination system, which can be part of a machine learning classification network, receives an exercise classification from a classification framework (e.g., DeepMove). The exercise classification can include a prediction that the user is performing a certain exercise with a given threshold confidence or accuracy.

In operation 1120, the combination system receives a match determination from a match framework (e.g., the match-based framework 1000, such as DeepMatch). The match determination can include an indication of a matched exercise (e.g., based on a comparison of embeddings) and a confidence or probability for the matched exercise.

In operation 1130, the combination system identifies an exercise within images based on the exercise classification and the match determination. For example, the system can utilize the exercise classification prediction and the match determination, along with the confidence levels for the outputs, to identify or determine the exercise or movement performed by the user.

Examples of Verifying Exercises for Follow Along Systems

As described herein, the follow along system 152 can utilize the classification information (e.g., pose or exercise classification) to determine whether the user 105 is "following along" or otherwise performing an activity being presented to the user 105 (e.g., via the user interface 125). For example, the follow along system 152 can include various modules, algorithms, or processes that filter predictions (e.g., noisy predictions) output from the classification system 140 and/or verify poses, exercises, and/or sequences of poses/exercises.

Figure 12A:
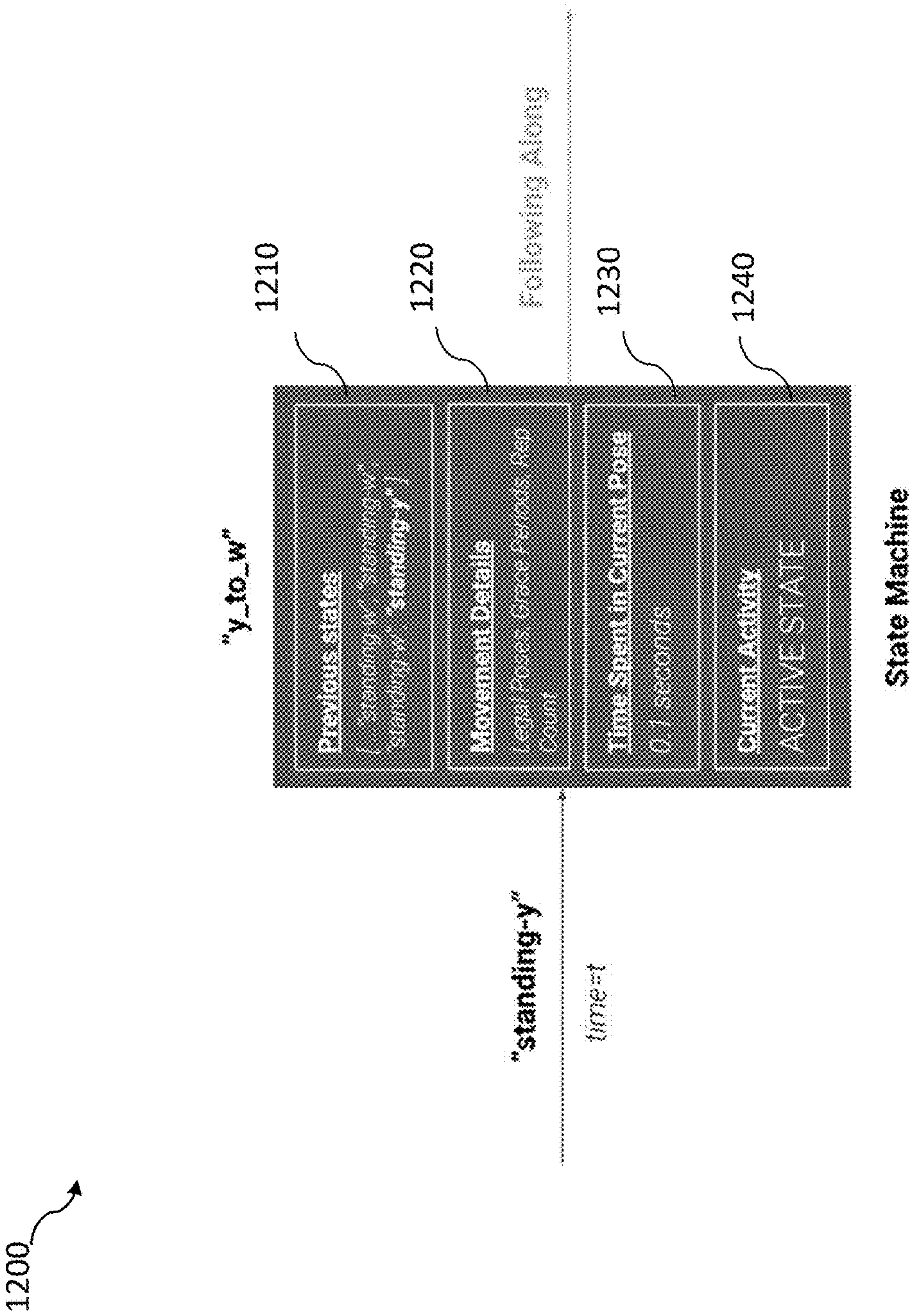
FIG. 12A is a diagram illustrating a pose state machine.

In some embodiments, the follow along system 152 includes a state machine or other logical component to identify and/or verify a status associated with a user when performing an activity (e.g., a status that the user 105 is performing a presented activity). FIG. 12A is a diagram illustrating a pose state machine 1200. The pose state machine 1200 provides or includes logic that receives a sequence of poses output by the classification system 140 (e.g., via a DeepPose classifier and/or DeepMatch classifier) and determines or generates a status for the user (e.g., the user is "following along").

For example, the follow along system 152 can verify that a user is moving through a list of legal or predicted poses: Standing→Squatting→Standing for Squats, during a presented class.

The state machine 1200, in some cases, functions as a tracking system. The state machine can track information related to "previous states" 1210, such as observed poses or time, information identifying a time spent in a current pose 1230, and movement details 1220 for a pose or movement being completed. The movement details 1220, which are compared to the previous state information 1210 and the current pose time information 1230, can include: (1) poses that should be seen while completing each movement exercise ("Legal Poses"), (2) an amount of time allowed to be spent in each pose ("Grace Periods" or "Timeouts"), and/or (3) rep counts.

The state machine 1200, based on the comparison, determines the state of the system as "Active" or "Not Active," which informs a status for the user of following along or not following along. In some cases, such as when exercises have variations (e.g., a bicep curl has variations of seated, standing, kneeling, and so on), the state machine 1200 considers any variation as a legal or verified pose.

In some cases, such as when the system 152, based on the state machine 1200 and the combination technique described herein, verifies the user is currently in a not active state (e.g., engaged in a non-activity or otherwise not performing an exercise activity), such as sitting, walking, drinking water, and so on), the system 152 determines that the user is not following along.

Figure 12B:
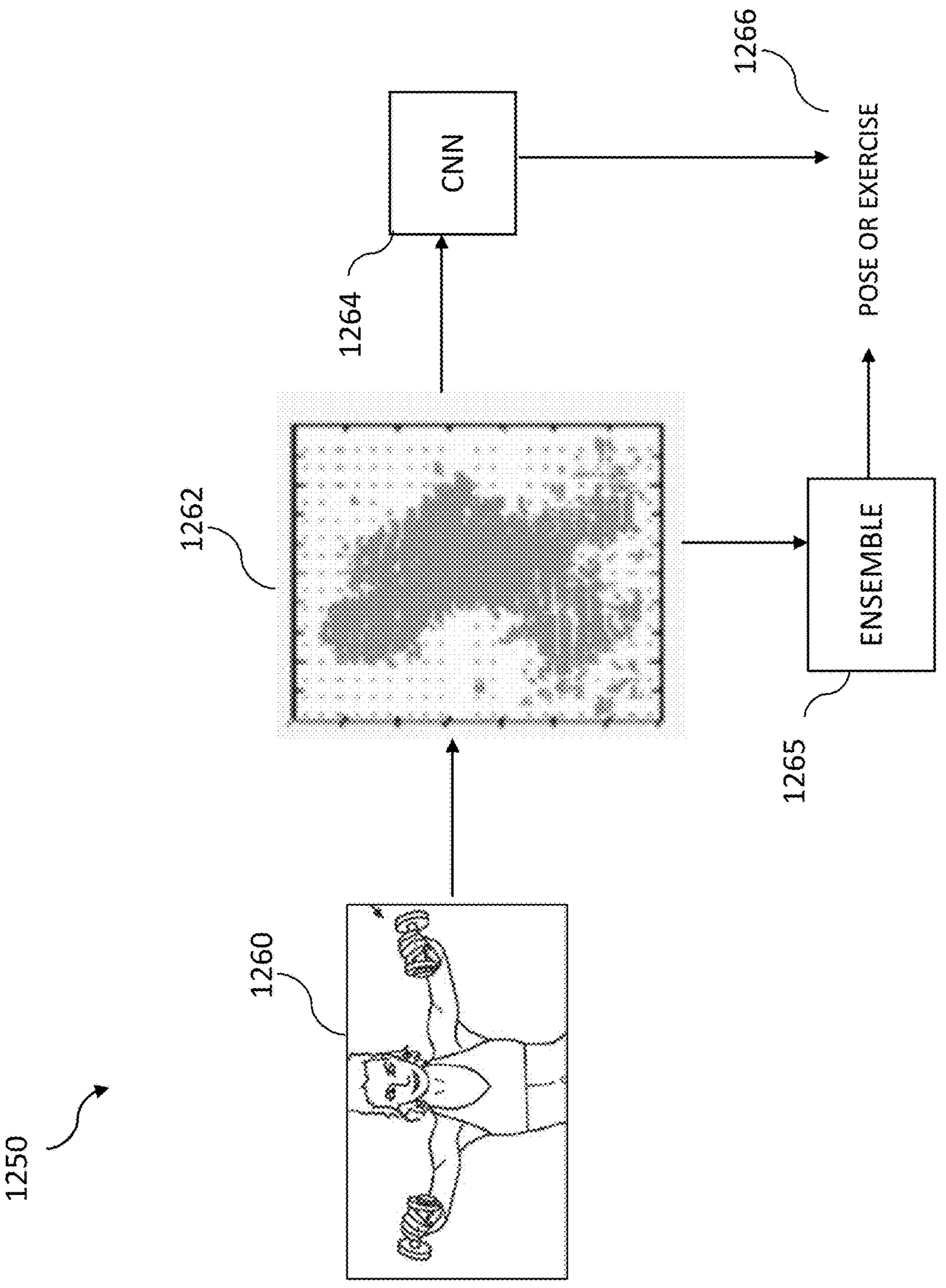
FIG. 12B is a diagram illustrating an exercise verification system using an optical flow technique.

In some embodiments, the follow along system 152 includes an optical flow technique to verify the exercise activity performed by a user. FIG. 12B is a diagram illustrating a verification system using an optical flow technique 1250. Optical flow is a technique that produces a vector field that gives the magnitude and direction of motion inside a sequence of images.

Thus, for an image pair 1260, the system 152 can apply the optical flow technique and produce a vector field 1262. The vector field 1262 can be used as a feature set and sent to a neural network (e.g., the convolution neural network 1264) and/or the combination technique 1265 (e.g., "ensemble," described with respect to FIG. 11), which use the vector field to determine a pose or exercise 1266 within the image pair, to identify or verify the user is performing a certain motion, such as a repetitive motion.

For example, the optical flow technique can act as a verification system, either in conjunction with a classification or matching framework (e.g., DeepMove plus DeepMatch) or alone. Thus, if the optical flow technique 1250 detects repetitive motion and, the classifier, such as DeepMatch, detects legal poses or movements, the follow along system 152, despite a less than confident exercise verification, can credit the user with a status of following along to an activity. In some cases, the follow along system 152 can determine that technique 1250 has detected repetitive motion (e.g., during a dance class activity), and credit the user, without any classification of the movements.

Figure 12C:
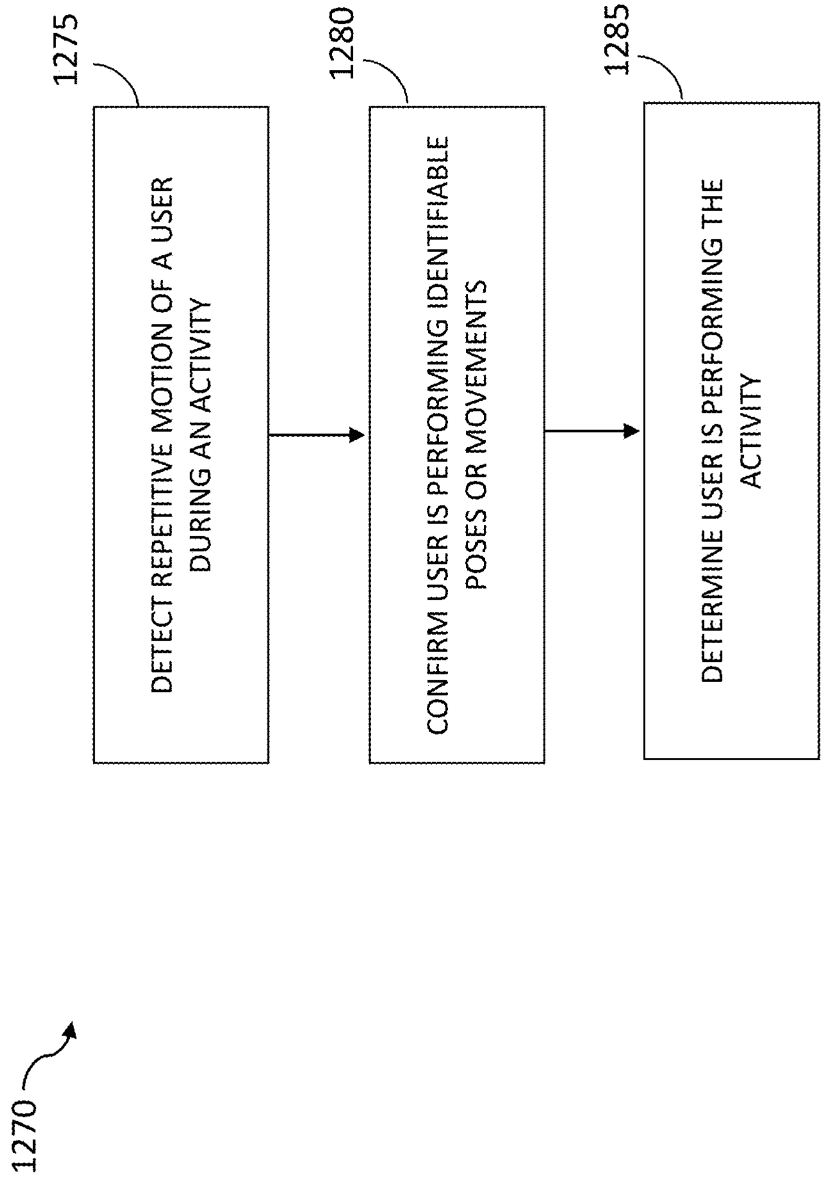
FIG. 12C is a flow diagram illustrating an example method for determining a user is following an exercise class.

FIG. 12C is a flow diagram illustrating an example method 1270 for determining an exercise performed by a user. The method 1270 may be performed by the follow along system 152 and, accordingly, is described herein merely by way of reference thereto. It will be appreciated that the method 1270 may be performed on any suitable hardware or by the various systems described herein.

In operation 1210, the system 152 detects a repetitive motion of a user during an activity. For example, the system 152 can employ the optical flow technique 1250 to detect or determine the user is repeating a similar motion (e.g., a sequence of the same movements).

In operation 1220, the system 152 confirms the user is performing identifiable poses or movements during the repetitive motion. For example, the system 152 can utilize the state machine 1200 to confirm that the user is performing identifiable or legal poses or movements (e.g., poses or movements known to the system 152).

In operation 1230, the system 152 determines the user is performing the activity, and thus, following along to a class or experience. For example, the system 152 can credit the user with performing the activity based on the combination of determining the repetitive motion and identifying the poses or movements as known poses or movements.

In some embodiments, the optical flow technique produces a vector field describing the magnitude and direction of motion in a sequence of images. Utilized along with the pose or exercise classifiers (e.g., utilized with Ensemble), the optical flow technique can verify that a user is actually moving, avoiding false positive inferences of performed movements or inferences.

The optical flow technique determines a user is moving as follows. Identifying the detected body key points as the initial points, the technique uses sliding windows to track min/max X & Y coordinates of each of the initial points and determines whether each point moves when (X_max−X_min) and/or (Y_max−Y_min) is above a threshold. The technique then determines motion happens when the number of the moving points is above a threshold number of moving points. The threshold number/values can be set with a variety of different factors, including the use of experimentation and/or hyperparameter tuning.

As a first example, for exercises that require being still and holding a pose (e.g., a plank): when the optical flow technique detects no movement above a certain threshold the combination technique also detects or infers the exercise, the system predicts the user is performing the exercise.

As another example, for exercises that require motion, when the optical flow technique detects motion above a certain threshold in the X and/or Y axes and the combination technique also detects that exercise, the system predicts the user is performing the exercise.

In addition to the optical flow technique, the system 152 can employ autocorrelation when detecting repetitive motion and verifying performance of an activity. The system 152 can utilize autocorrelation techniques and peak finding techniques on embeddings generated by the DeepMatch/DeepPose frameworks described herein to detect repetitive motion, and verify a user is following along.

In some embodiments, the following along system 152 utilizes test sets that balance different conditions associated with workout environments, user characteristics, and so on. For example, the system 152, before being utilizes to perform exercise recognition and confirmation is tested against a dataset of videos that cover various environmental conditions (e.g., lighting conditions, number of background people, etc.) and people with different attributes (e.g., body type, skin tone, clothing, spatial orientation, and so on). Such testing is above certain thresholds, including a minimum of 15 videos per exercise, with certain coverage of each attribute or characteristic or variable (e.g., at least four videos for each of fitzpatrick skin tones [1-2, 3-4, 5-6] and at least three videos for each body type [underweight, average, overweight] and at least two videos for each orientation [0, 45, 90 degrees]).

Given a limited number of videos (or other visual datasets), the testing system can utilize a smaller number of videos or data and optimize the testing with fewer videos. For example, the system can employ a solution that tracks the 0-1 Knapsack problem, when the videos are the items, the capacity is N (e.g., set to 15 or other amounts), and a value of similarity of the knapsack's attribute distribution to the desired distribution is the value to be maximized. Thus, the system 152 can train or otherwise be enhanced based on a smaller data set (e.g., fewer videos) while being optimized for different exercise conditions or differences between activity performances, among other benefits.

In some embodiments, the computer vision frameworks and models described herein can be trained using video clips of performed exercise movements (e.g., a data collection pipeline) that is supplemented by 3D modeling software that creates animated graphics of characters performing the same or similar movements (e.g., a data generation pipeline). By generating the data (e.g., 3D characters performing movements), the system can scale or generate any number of training datasets, among other benefits.

Generating the pipeline (e.g., synthetic data or video clips of CGI 3D characters completing exercises) includes collecting exercise animation data. The data can be collected via motion capture technology, which matches the joints of a source actor completing the movement to the joints of a virtual skeleton. The virtual skeleton is then transferred to any number of 3D characters to provide representations of different "people" with varying attributes completing the same exercise.

The system can then place the 3D characters into full 3D environments using 3D graphics software, where environmental attributes are tunable. These attributes include camera height, lighting levels, distance of character to camera, and/or rotational orientation of the character relative to the camera. The system exports rendered animation clips via the pipeline, which are used as synthetic training data for computer vision applications.

Examples of Performing User Focus Functions

Figure 13A:
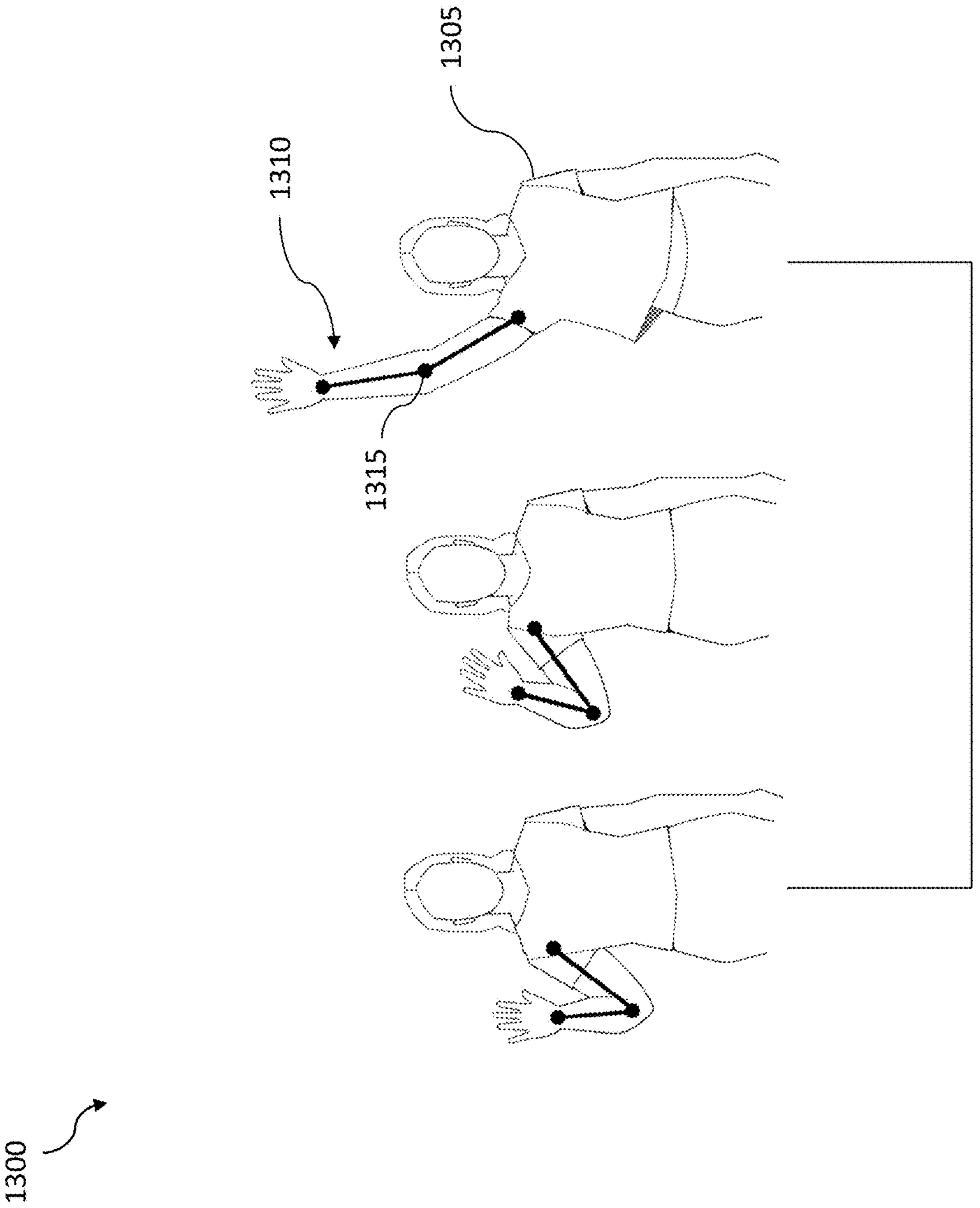
FIG. 13A is a diagram illustrating a lock-on technique for targeting a user of an activity.

As described herein, a lock on system 154 can utilize the classification information to determine which user, in a group of users, to follow or track during an activity. The lock on system 154 can identify certain gestures performed by the user and classified by the classification system 140 when determining or selecting the user to track or monitor during the activity. FIG. 13A is a diagram illustrating a lock-on technique 1300 for identifying a user to monitor during an activity.

The lock on system 154 is a mechanism that enables users to perform a hand gesture or other movement to signal to the system 154 which user should the system 154 track and focus on, in the event there are multiple people working out together.

The system 154 receives key points from a keypoint detector (e.g., keypoint detector 720 or 1020) and checks against predefined rules and/or uses an ML classifier (as described herein) to recognize the gesture (e.g., as a pose). The system 154 can include a tracking algorithm that associates unique IDs to each person in the frame of images.

The system 154 can select the ID of the person who has gestured as a "target user" and propagates/sends the selected ID to the repetition counting system 158 and/or the follow along system 152 for repetition counting or follow along tracking. In some cases, the system 154 can include template matching, where users provide information identifying a pose or gesture to be employed when signaling to the system 154 the user to be monitored during the activity.

For example, the system 154 can identify user 1305 when the user 1305 performs a certain pose/gesture, such as a pose or gesture of a "right-hand raise" 1310. The system 154, using the various techniques described herein, can identify the pose/gesture within the image based on the key points 1315 being in a certain configuration or pattern (and thus satisfying one or more rules), and select the user as a user to lock onto (or monitor or track) during an exercise activity.

Of course, other poses/gestures (heads nods, leg movements, jumps, and so on, including poses/gestures capable of being performed by all users) can be utilized when the lock on system 154 selects a person or ID within an image to follow along or otherwise track for exercise verification or other applications.

Figure 13B:
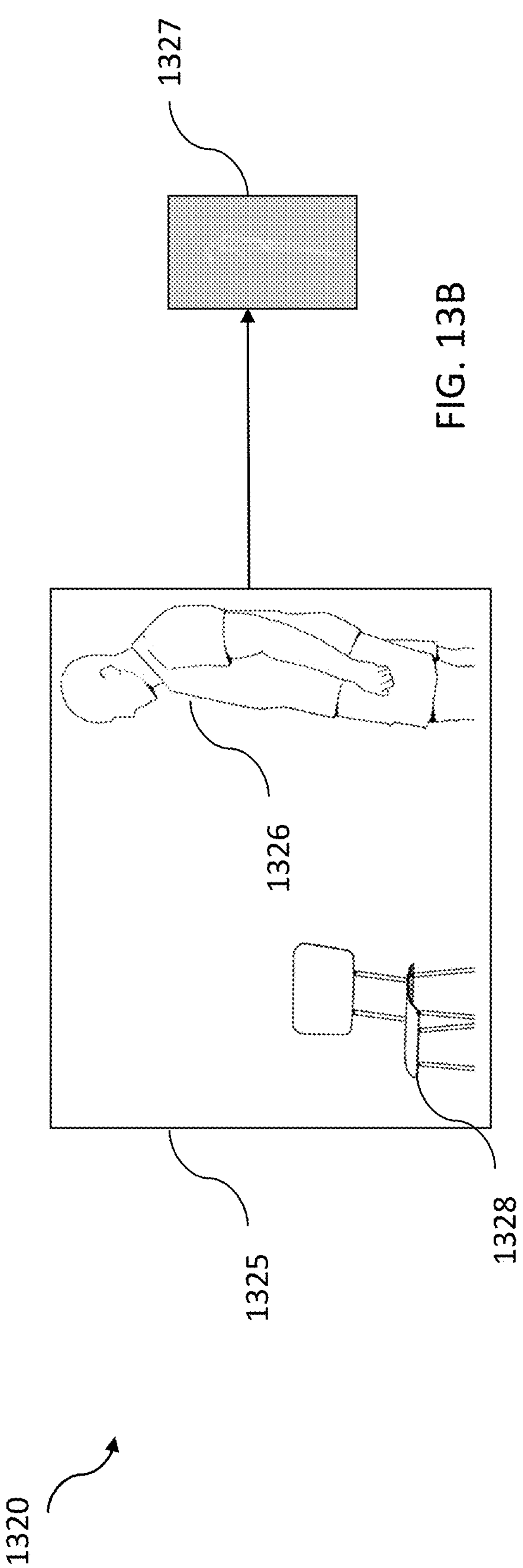
FIGS. 13B-13C are diagrams illustrating the smart framing of a user during an activity.
Figure 13C:
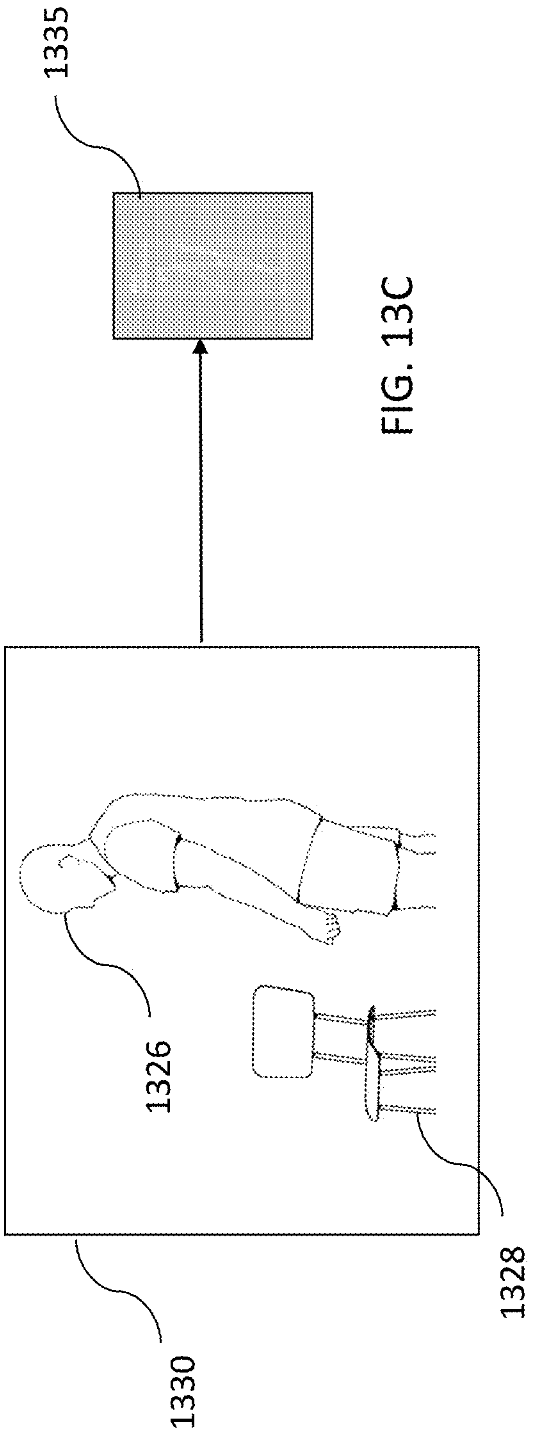

Further, as described herein, a smart framing system 156 tracks the movement of the user 105 and maintains the user in a certain frame over time (e.g., with respect to other objects in the frame) by utilizing classification information when tracking and/or framing the user. FIGS. 13B-13C are diagrams 1320 illustrating the smart framing of a user during an activity.

FIG. 13B depicts the tracking of a person 1326, paused at a first movement state 1325, with respect to an object 1328 (or other objects) within the frame. The smart framing system 156 utilizes a PID (proportional-integral-derivative) controller to create an "AI Cameraman" where the system 156 follows the person, in a wide-angle camera setting, within the frame.

The system 156 receives information from a person detector (such as bounding box information), outputting a tracking image 1327 of the person in the first movement state 1325. For example, the system 156 receives a person location as an input signal, outputs information that is proportional to the difference between a current AI Cameraman or smart frame location and the input person location. For example, the system 156, as depicted in FIG. 13C, outputs a tracking image 1335 that is based on an updated movement state 1330 of the person 1326 (e.g., with respect to the object 1328).

As described herein, the exercise platform can employ a classification system 140 that utilizes various classification techniques to identify and/or classify poses or exercises being performed by users. Various applications or systems, as described herein, can utilize the classification information to verify a user is exercising (e.g., is following along), and/or track or focus on specific users, among other implementations.

Examples of Counting Repetitions

As described herein, the various computer vision techniques can inform repetition counting, or rep counting, systems that track, monitor, or count a number of repetitions performed by a user during an exercise activity. For example, the repetition counting system 158 (e.g., "rep counting system") can utilize the classification or matching techniques to determine a number of repetitions of a given movement or exercise are performed by the user 105.

The system 158 can utilize the exercise detection modules (e.g., DeepMove and DeepMatch) to count the number of exercise repetitions a user is performing in real time. The system 158 can utilize "inflection points," which are demarcated as the high and low points of a repetitive motion. The system 158 can track the high and low points as the user performs an exercise to identify how many cycles of a high/low repetition a person has performed.

The system 158 identifies the high and low points via an additional model head (e.g., a single fully connected neural network layer) that sits on top of the DeepMove framework. In some cases, the framework includes an exercise specific model head for each exercise, since high and low points can be unique for each exercise. Further, the system 158 can train the exercise heads together (along with follow along). Thus, the model can perform multiple tasks—follow along, rep counting, and/or form correction.

Once the model has predicted high/low points, the system 158 tracks the transitions across time in a simple state machine that increments a counter every time an individual hits a target inflection point, where the target is a threshold on the model prediction. The target can be either high or low, depending on the exercise. To increment a rep counter, the system also determines the user is following along, as described herein. Further, as the repetition count changes over time, the system 158 can derive or determine rep cadence that identifies a cadence of the user performing exercise repetitions.

Figure 14:
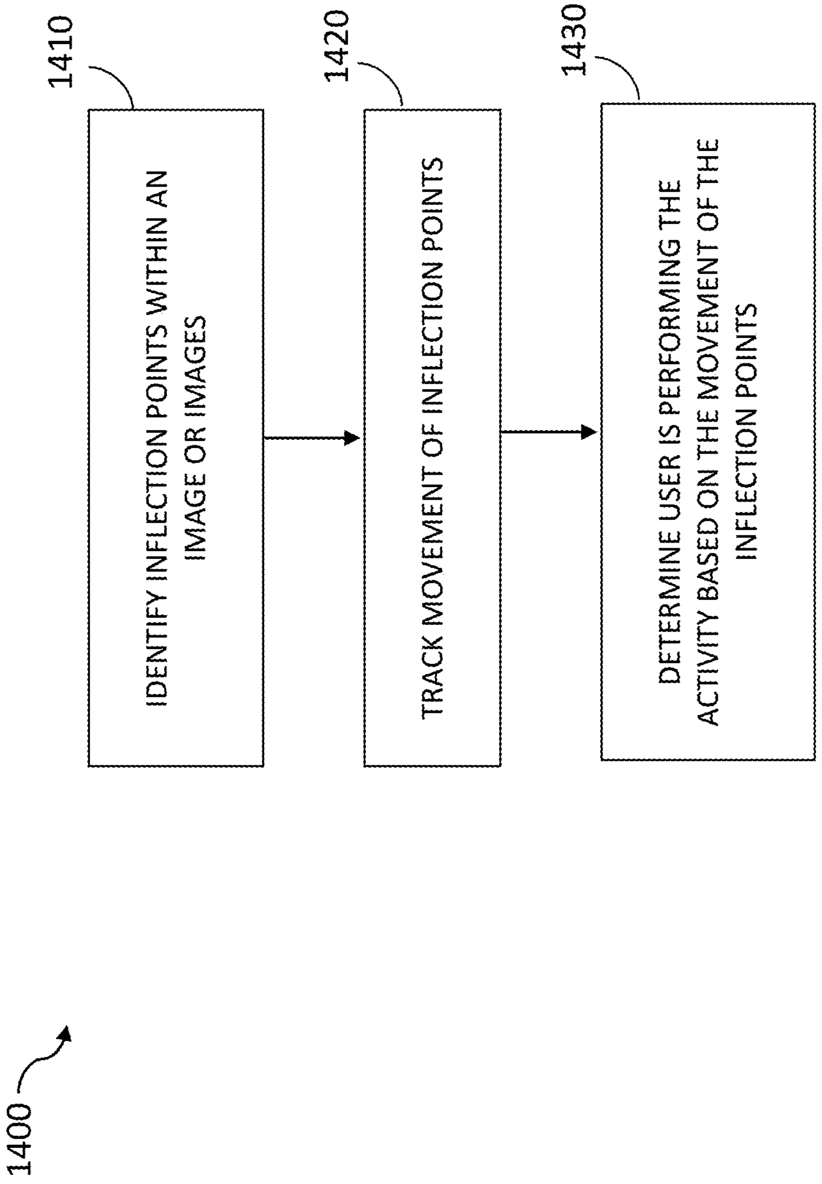
FIG. 14 is a flow diagram illustrating an example method for counting repetitions of an exercise performed by a user.

FIG. 14 is a flow diagram illustrating an example method 1400 for counting repetitions of an exercise performed by a user. The method 1400 may be performed by the rep counting system 158 and, accordingly, is described herein merely by way of reference thereto. It will be appreciated that the method 1400 may be performed on any suitable hardware or by the various systems described herein.

In operation 1410, the system 158 identifies one or more inflection points within an image or images of a user performing an exercise activity. For example, the system can identify high and low points of a repetitive motion performed by the user within the images (e.g., a hard or shoulder).

In operation 1420, the system 158 tracks the movement of the inflection points. For example, the system 158 can identify how many cycles of a high/low repetition a person has performed, such as a cycle from a low point, to a high point, and back to the low point (or a related low point).

In operation 1430, the system 158 determines a user is performing the activity based on the movement of the inflection points. For example, the system 158, once the model has predicted high/low points for the exercise, tracks the transitions across time in a simple state machine that increments a counter every time an individual hits a target inflection point or completes a movement cycle, where the target is a threshold of the predictive model.

Thus, using RGB or other 2D sensors (e.g., images captured by RGB sensors), the system 158 can perform repetition counting for a user, such as the user 105 performing various exercises during a live or archived exercise class.

Examples of the Movements Database and Associated Systems

As described herein, the systems and methods, in some embodiments, include a movements database (dB) 160 that stores information as entries that relate individual movements to data associated with the individual movements. A movement is a unit of a workout or activity, such as the smallest unit or building block of the workout or activity. Example movements include a push-up or a jumping jack or a bicep curl.

Figure 15:
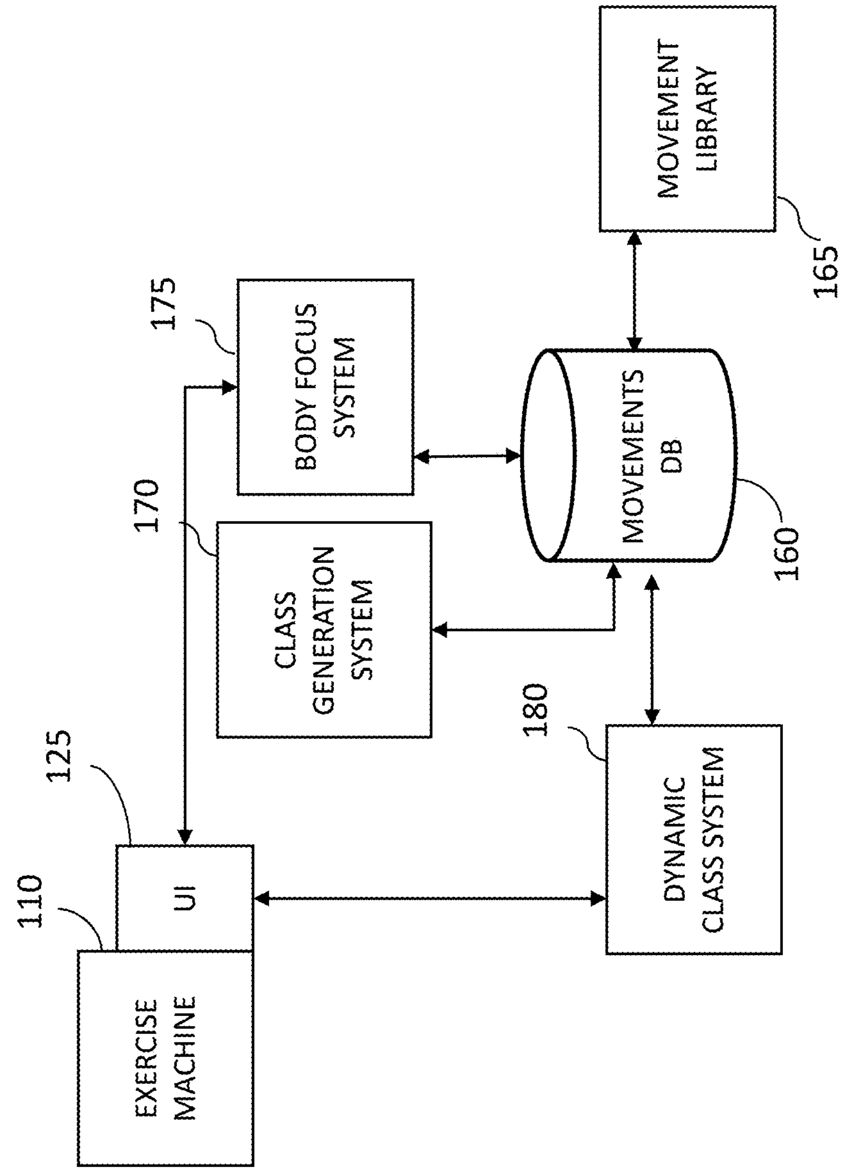
FIG. 15 is a block diagram illustrating a movement system for an exercise platform.

FIG. 15 depicts interactions between the movements database 160 and other systems or devices of an exercise platform or connected fitness environment. For example, the movements database 160 can be accessible via various user experience or content systems, such as the class generation system 170, the body focus system 175, the dynamic class system 180, and so on.

FIG. 16 is a table 1600 that illustrates an example movements database 160 for the exercise platform. The movements database 160 includes various entries 1610 that relate a movement to metadata and other information, such as information associated with presenting content to users, filtering content, creating enhanced or immersive workout experiences, and so on.

Each entry includes various information stored with and related to a given movement 1620. For example, the movements database 160 can store, track, or relate various types of metadata, such as movement name or identification information 1620 and movement context information 1630. The context information 1630 can include, for each movement:

- skill level information that identifies an associated skill level for the movement (e.g., easy, medium, hard, and so on);
- movement description information that identifies or describes the movement and how to perform the movement;
- equipment information that identifies exercise machines (e.g., a rowing machine) and/or other equipment (e.g., mats, bands, weights, boxes, benches, and so on) to utilize when performing the movement;
- body focus information (e.g., arms, legs, back, chest, core, glutes, shoulders, full body, and so on) that identifies a body part or parts targeted during the movement;
- muscle group information (e.g., biceps, calves, chest, core, forearms, glutes, hamstrings, hips, lats, lower back, mid back, obliques, quads, shoulders, traps, triceps, and so on) that identifies a primary, secondary, and/or tertiary muscle group targeted during the movement; and so on.

The movements database 160 can also store or contain ML movement identifier information 1640. The ML movement identifier information 1640 can link or relate to a body tracking algorithm, such as the various algorithms described herein with respect to tracking, identifying, and/or classifying poses, exercises, and other activities. Further, the movements database 160 can store related movement information 1650 identifying movement variations, as well as related movements, movement modifications, movements in a similar exercise progression, compound movements that include the movement, and so on.

The movements database 160 can also track related content information 1660, such as videos or images associated with the movement. For example, the movements database 160, as described herein, is associated with the movement library 165. The movement library 165 includes or stores short videos (e.g., GIFs) and long videos (e.g., ~90 seconds or longer) of movements, exercises, activities, and so on. Thus, the movements database 160 can store the video library information as the content information 1670, and track or maintain a relationship between a movement and a video or GIF within the movement library 165. Of course, the movements database 160 can store information, such as other metadata, not depicted in FIG. 16 or otherwise described herein.

Thus, the movements database 160 can store metadata and other information for various movements that act as building blocks or units of class segments and classes. Virtually any pose or action can be a movement, and movements can be units of a variety of different activities, such as strength-based activities, yoga-based or stretching-based activities, sports-based activities, and so on.

For example, Table 1 presents a number of example movements that act as units for a class segment or class that facilitates a strength-based activity, exercise, or workout:

TABLE 1

| Movement | Number of Variations |
|---|---|
| Push press | 2 |
| Pushup (push) | 2 |
| Pushup jacks | 2 |
| Renegade row | 5 |
| Reverse fly | 4 |
| Reverse lunge | 16 |
| Roll up | 2 |
| Russian twist (rotation) | 4 |
| Scissor kicks | 2 |
| Shoulder Extension | 1 |
| Shoulder taps | 2 |
| Side bends: standing and hk | 4 |
| Single leg deadlift | 6 |
| Skater hop | 2 |
| Skull crusher | 7 |

As depicted in Table 1, each movement can have multiple variations. Table 2 presents the variations for a specific movement, a "reverse lunge":

TABLE 2

| | |
|---|---|
| Reverse lunge | Alternating lunges |
| Reverse lunge | Alternating, single dumbbell pass through |
| Reverse lunge | Lunge to press, single arm lunge to press |
| Reverse lunge | Offset lunge |
| Reverse lunge | Single DB |
| Reverse lunge | Single side |
| Reverse lunge | With arms by side |
| Reverse lunge | With arms extended at 90 degrees |
| Reverse lunge | With arms held overhead |
| Reverse lunge | With arms on hips |
| Reverse lunge | With curl simultaneously |
| Reverse lunge | With runner arms |
| Reverse lunge | With twist no weight, reverse lunge twist with DB |
| Reverse lunge | With weights by sides |
| Reverse lunge | With weights overhead, with single DB OH |
| Reverse lunge | With weights racked |

As another example, Table 3 presents a number of example movements that act as units for a class segment or class that facilitates a yoga-based activity, exercise, or workout:

TABLE 3

| |
|---|
| Side Crow |
| Side Lunge (Skandasana) |
| Side Plank |
| Sphinx |
| Splits |
| Squat (or Garland) |
| Staff |
| Standing Forward Fold |
| Standing Splits |
| Standing Straddle Forward Fold |
| Star |
| Sugar Cane Pose |
| Supine Spinal Twist |
| Supported Fish |
| Tree |
| Triangle |
| Tripod Headstand |
| Twisted Seated Half Forward Fold |
| Warrior |

Thus, as depicted in Tables 1-3, a movement can be any discrete unit of a workout or activity, and have associated variations, modifications, progressions, or combinations.

Examples of Atomic Segmentation of Exercise Classes

Figure 17A:
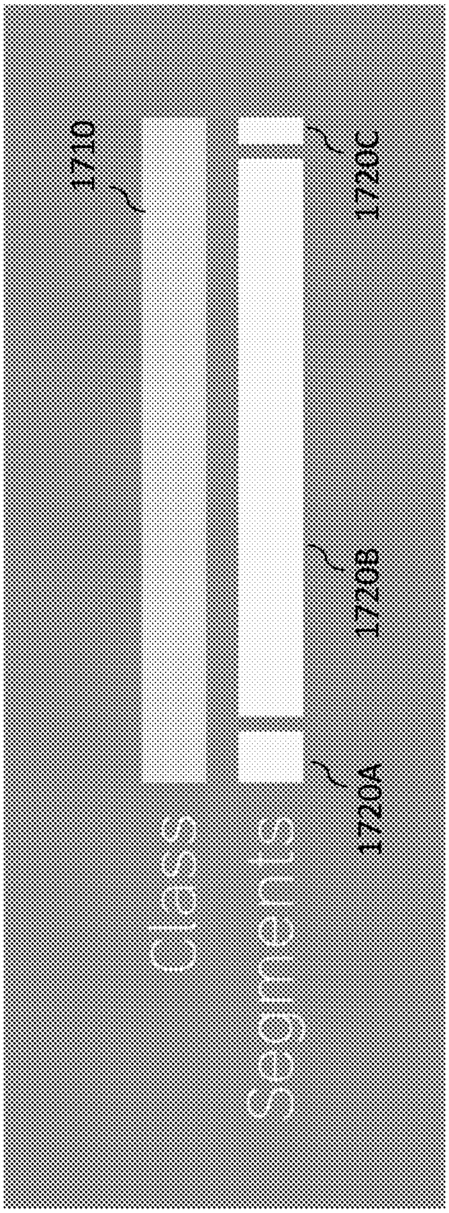
FIGS. 17A-17B are diagrams that present the atomic segmentation of a class or segment.
Figure 17B:
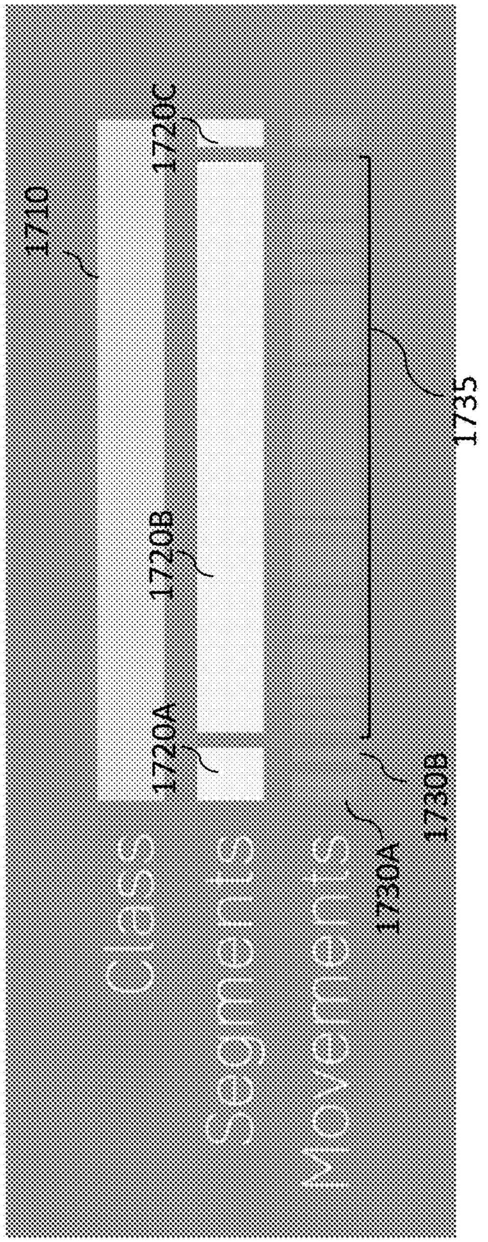

As described herein, a class is formed of segments, and a segment is formed of movements. FIGS. 17A-17B are diagrams that represent the atomic segmentation of a class plan. A class 1710 is formed of three segments 1720A-C. For example, a 20-minute strength training class 1710 can include a warm-up segment 1720A, a circuit lifting segment 1720B, and a cool down segment 1720C.

Each of segments, then, are made up of one or more movements. For example, the warm-up segment 1720A is formed of two movements 1730A and 1730B. The circuit lifting segment is formed of a group of 11 lifting segments 1735, such as 11 segments chosen from the list of segments depicted in Table 1 and stored within the movements database 160. Thus, the segments 1735 are the units, or building blocks, of the circuit lifting segment 1720B.

A class can be planned by an instructor by selecting various movements to form the segments. For example, the class generation system 170 can utilize information from the movements database 160 when generating, selecting, and/or recommending classes for users, such as classes that target specific muscle groups or body parts.

In some cases, the system 170 is associated with a planning application or interface, which enables instructors to plan classes for users. Via the system 170, the instructor picks the order and expected duration of every movement. After a plan or framework of the class is finalized, the plan is sent to a "segment control board" or other system where control room studio technicians manage and control presentation (e.g., live streaming) of the class. In some cases, the management and/or control of a class can be performed by a studio technician or producer, an automated producer or a hybrid of technician and automated system.

Once a class starts, a technician or producer (or automated system) can trigger when the instructor transitions from one movement to the next movement (e.g., acting as a sort of "shot clock operator" for the instructor of the class). For example, if the class plan includes a movement of bicep curls having a duration of 30 seconds, and another movement of shoulder presses for 30 seconds, a technician can monitor and determine when the instructor switches between movements and update the segment control board to the current movement. In some cases, an automated system, using the pose or exercise detection techniques described herein, can automatically update the control board and user experience to reflect the current movement performed by the instructor in the class.

Further, by having a person (or automated system) trigger the transition from movement-to-movement in real time, the system 170 can accurately timestamp the movements within the class (e.g., to seconds). For example, while a class plan includes an expected plan (e.g., 30 secs bicep curl and then 30 secs shoulder press), the class may not follow the exact plan (e.g., the instructor may perform a 35 secs bicep curl and then a 25 secs shoulder press). By timestamping the class based on the actual duration of each movement, the system 170 can generate a more accurate and representative record of the class as it was performed by the instructor.

Examples of the Body Focus System

As described herein, the body focus system 175 (or body activity system) can utilize information stored by the movements database 160 when presenting information to the user 105 that identifies how a certain class or activity strengthens or works the muscles of their body. The body focus system 175 can present interactive content that highlights certain muscle groups, displays changes to muscle groups over time, tracks the progress of the user 105, and so on.

Using information from the movements database 160 and atomically segmented classes, the body focus system 175 can provide a number of interactive services regarding selecting and participating in classes and other workout activities. For example, the body focus system 175 can help users (e.g., members of a connected fitness platform) find classes based on muscle groups they wish to work or target, present a precise or granular class plan of movements, present countdowns for each movement, track or credit their completed movements and the associated body parts or muscle groups, generate recommendations for classes and/or generate individualized classes or activities based on movements associated with muscle groups to target, utilize the body tracking and pose/exercise classification techniques described herein to credit users with completed movements, present tutorials or other instructional content associated with the movements, and so on.

As a first example, the body focus system 175 can assist users with identifying and selecting classes associated with muscle groups targeted by users. In some cases, the system 175 applies rules or algorithms to determine or computer muscle groups worked (e.g., utilized or exercised) during a class. The rules or algorithm can calculate scores for each muscle based on duration of class time spent on the muscle group (via the movement information), the percentage of the class spent on the muscle group, whether a muscle group was a primary focus, secondary focus, tertiary focus, and so on, of the class, and other weighted factors.

Thus, since the system 175 can access the movements database 160 to identify muscle groups worked by any movement, the system 175 can determine which muscle groups, and to what extent, are worked for a given class. The system 175 can facilitate users to filter classes by the muscle groups they wish to target. For example, the user 105 can filter classes for "biceps" and find classes that have a focus on movements that will work her biceps. When filtering for classes that focus on a certain muscle group, the system 175 can set a minimum focus percentage (e.g., at least 15%) for the muscle group in the class. Thus, filtering classes based on a targeted muscle group will result in displaying classes that work the muscle group for at least 15 percent of the class.

Figure 18:
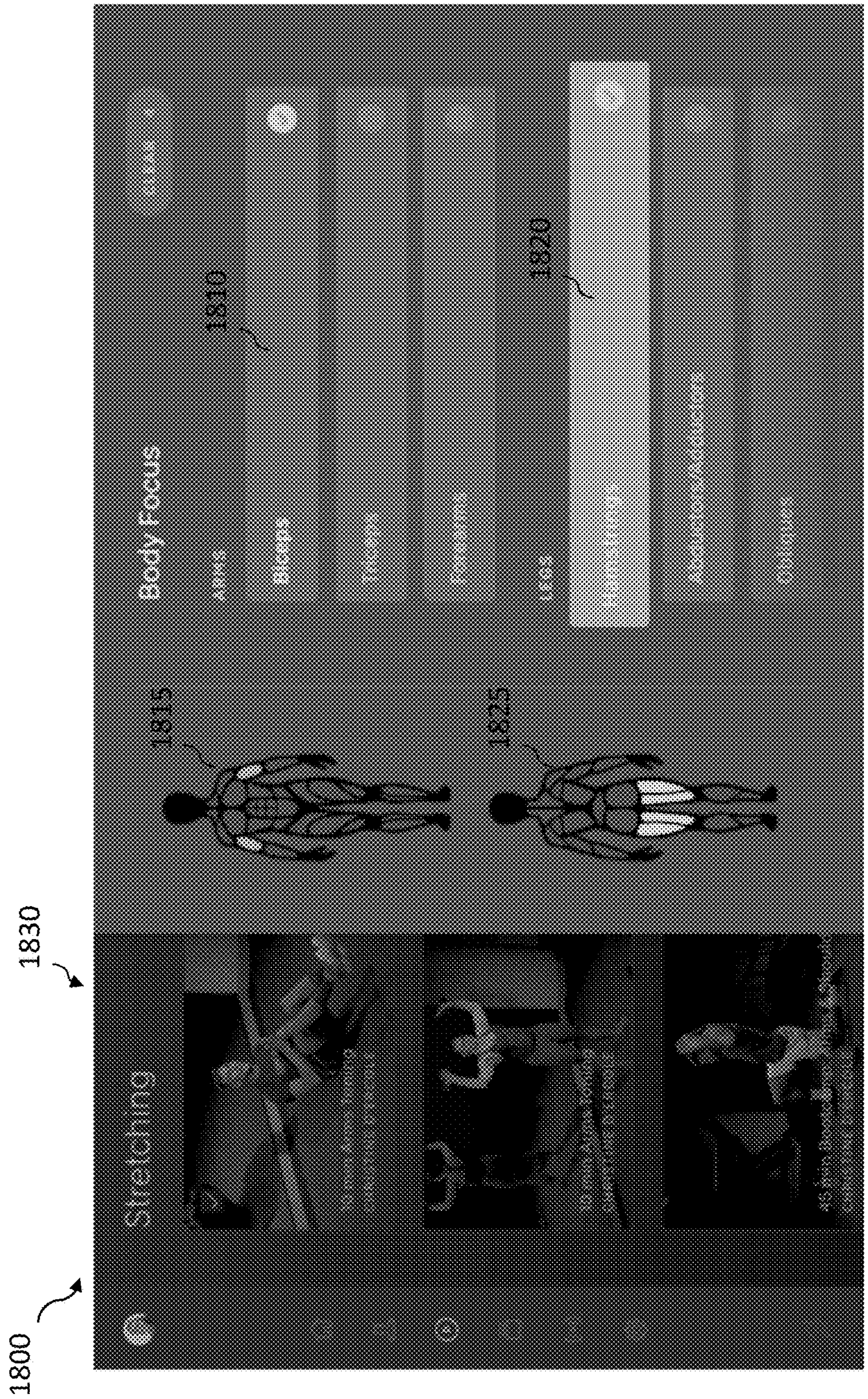
FIG. 18 is a diagram illustrating an example user interface that presents body focus information to a user of an activity.

FIG. 18 depicts a user interface 1800 that facilitates the filtering of classes by targeted muscle group. The user interface 1800 includes various user-selectable filters, where a user has selected a "biceps" filter 1810 and a "hamstrings" filter 1820. Along with the filters, the user interface 1800 presents a graphical depiction of the selected muscle groups, such as a body image 1815 or avatar that highlights the biceps, and a body image 1825 or avatar that highlights the hamstrings. Further, the user interface presents various classes 1830 that satisfy the filtering criteria of the system 175, such as stretching classes that include movements associated with targeting the hamstrings.

Figure 19:
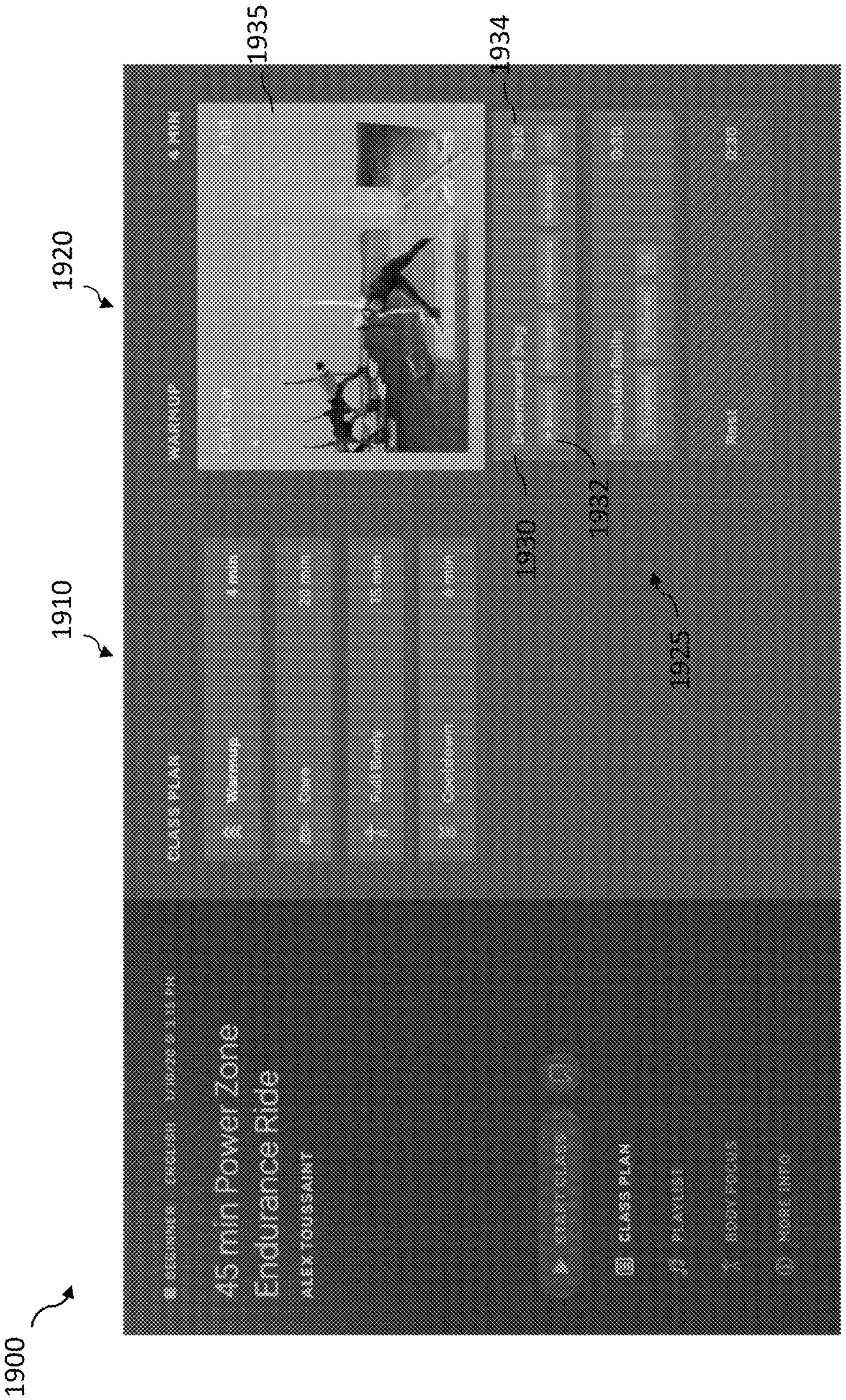
FIG. 19 is a diagram illustrating an example user interface that presents a class plan to a user of an activity.

As another example, the body focus system 175 can present users with a precise or granular class plan for a selected class. The class plan includes planned movements to be performed by an instructor in the class. FIG. 19 depicts a user interface 1900 that presents a class plan to a user of an activity. When a user selects a class, the user interface 1900 presents the segments 1910 to be performed in the class, as well as the movements 1920 that constitute each segment 1910 of the class. For example, the warm-up segment can include multiple movements 1925 that make up the segment.

Further, for each movement presented to the user, the user interface 1900 can present related information (e.g., accessed and/or retrieved from the movements database 160). Example related information can include the name of the movement 1930, the muscle groups associated with the movement 1932, the duration of the movement in the class 1934, and a video tutorial or demonstration of the movement 1935 (all information stored in the movements database 160).

Figure 20:
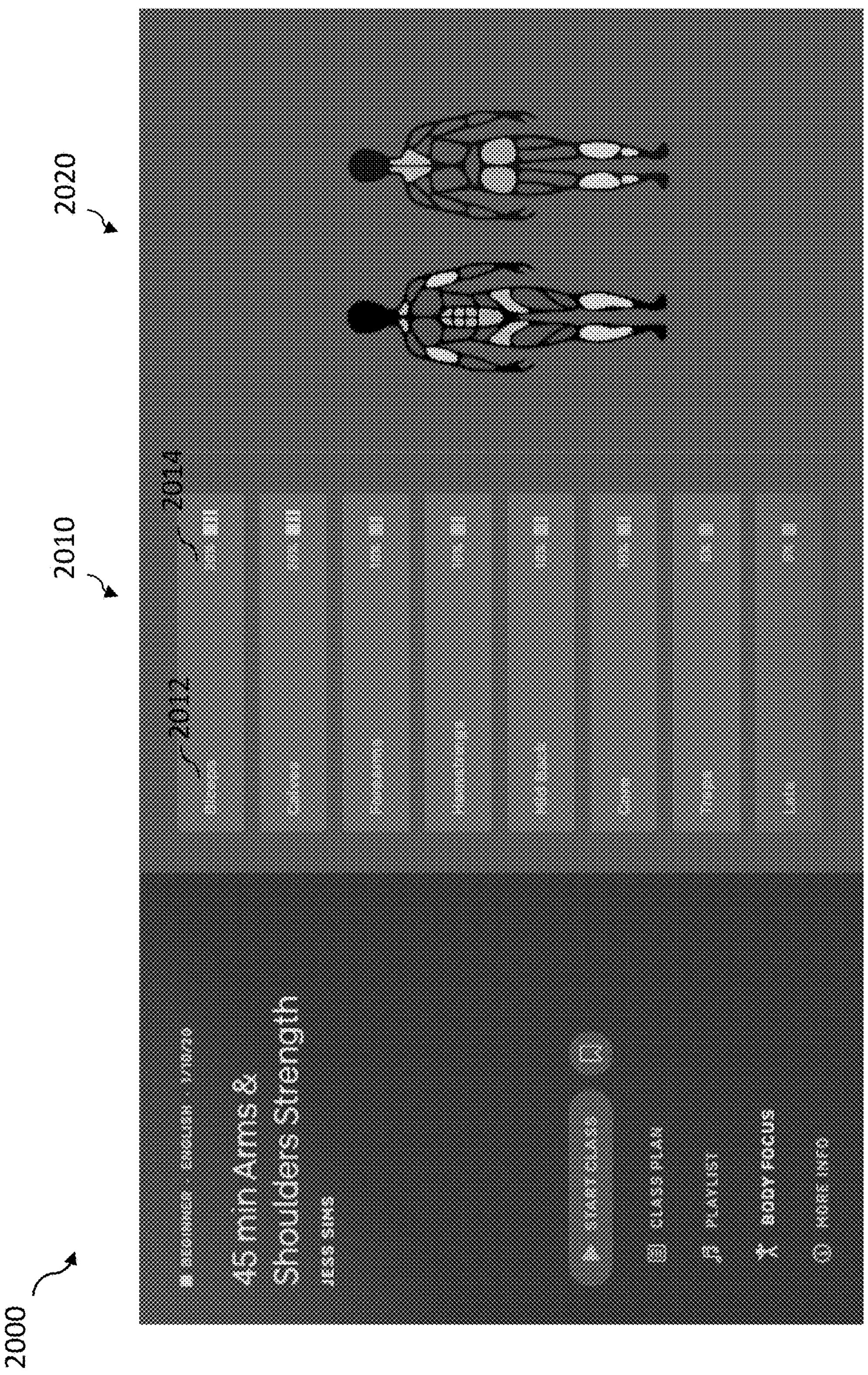
FIG. 20 is a diagram illustrating an example user interface that presents muscle-based class plan information to a user of an activity.

FIG. 20 depicts a user interface 2000 that presents muscle-based class plan information to a user of an activity. The user interface 2000 can present users with information specific to the muscles they will work during the class, such as information 2010 that identifies the targeted muscle groups, including the name 2012 of the muscle group and the percentage of the class 2014 that works the muscle group. The user interface 2000 also present a body image 2020 of the muscles worked during the class. The body image 2020 can highlight the targeted muscle groups, using colors or intensities to identify the amount of the class spent on the different muscle groups (e.g., brighter regions indicate the muscle groups that are worked the most in the class).

Figure 21:
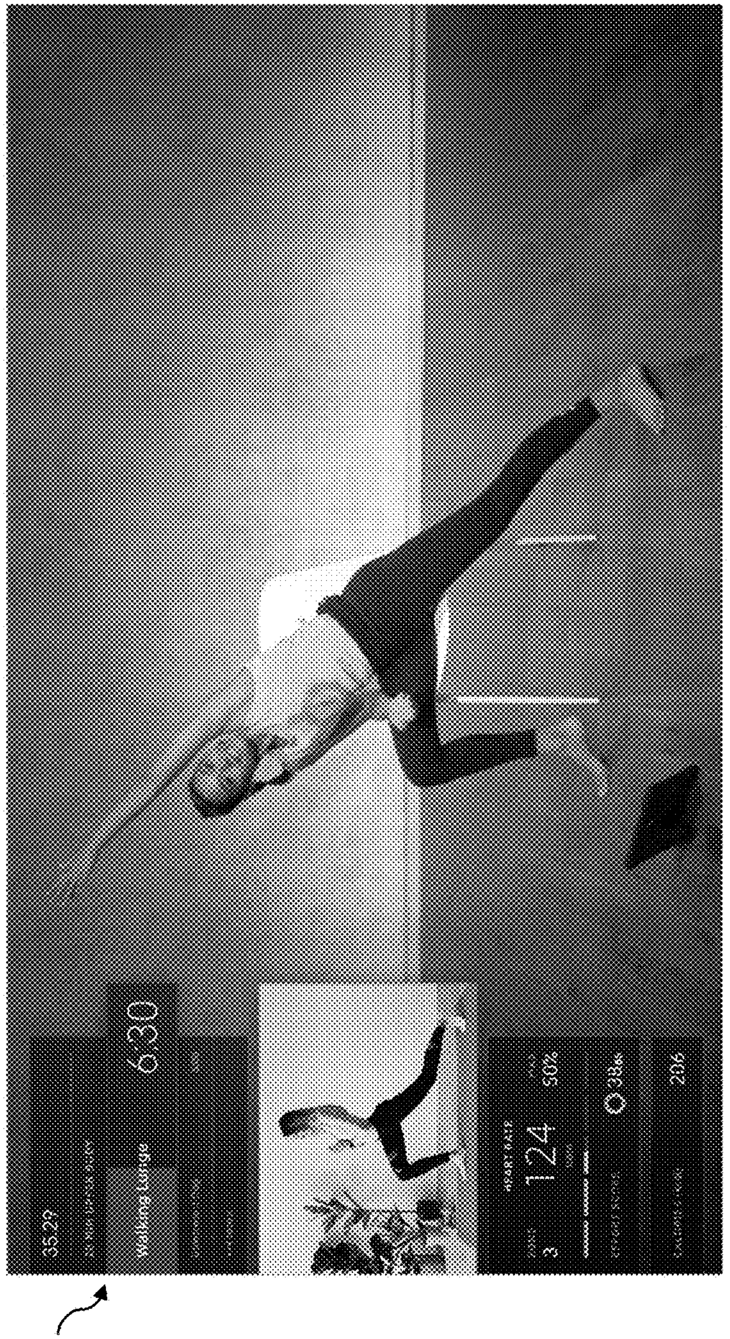
FIG. 21 is a diagram illustrating an example user interface that presents class progress information to a user of an activity.

As another example, the body focus system 175 can present countdowns or other progress information to users during a class or activity. FIG. 21 depicts a user interface 2100 that presents class progress information to a user of an activity. The user interface 2100 can present a movement order 2110 and duration, providing users with information about a current movement, information identifying the next movement or movements, and so on. The system 175, therefore, provides users with a visual countdown of the class, presenting them with guidance information so they are aware of how long a movement is, what the next movement is, and so on.

Figure 22:
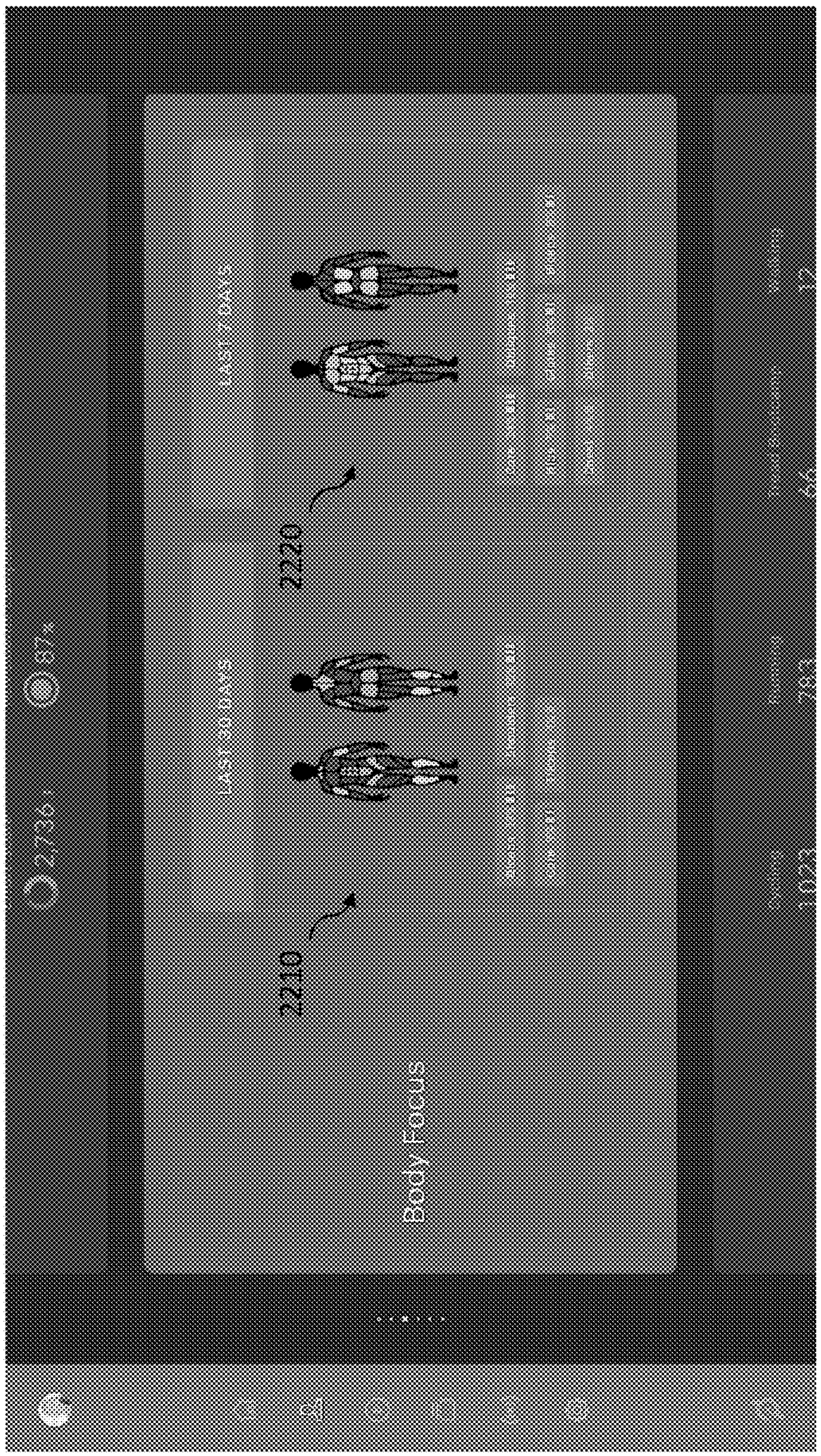
FIG. 22 is a diagram illustrating an example user interface that presents user progress information to a user of an activity.

As described herein, the body focus system 175 can credit users when they complete movements, segments, classes, and so on. FIG. 22 depicts a user interface 2200 that presents user progress information to a user of an activity. The user interface 2200 can present information over various durations, such as a body image 2210 that reflects progress over a month and/or a body image 2220 that reflects progress over a most recent week. The user interface 2200 can present the body image 2210, 2220, or avatar, with filled in muscle groups based on movements associated with classes performed by the user within a certain time period.

In some cases, such as for an individual class, the body avatar reflects filled in muscle groups member after a class that are similar to the muscle groups presented with the class (e.g., the muscles a user targets in a single class are the muscles the system 175 presented as being associated with the class). Further, the system 175 can update the body images every time a user finishes a class, to show the credit given to the user for the class. The body images 2210, 2220, therefore, can reflect aggregated credit or earnings for a user after the completion of multiple classes over a certain time period.

Figure 23:
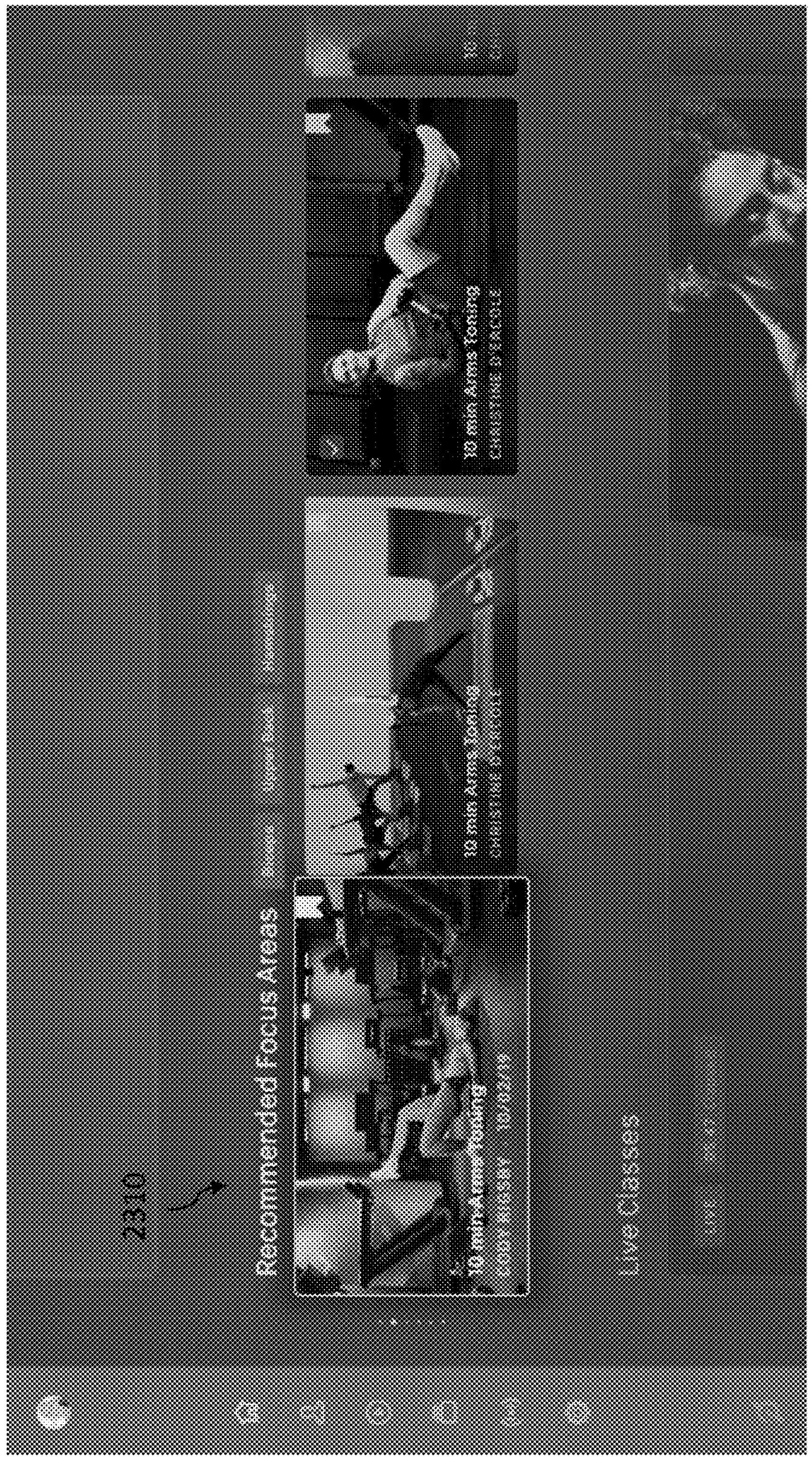
FIG. 23 is a diagram illustrating an example user interface that presents class recommendation information to a user of an activity.

Further, in some embodiments, the body focus system 175 can recommend classes to users. FIG. 23 depicts a user interface 2300 that presents class recommendation information to a user of an activity. The body focus system 175, having knowledge of what muscles a user has worked over a certain time period, can identify or determine classes to recommend to the user based on the knowledge. For example, the system 175 can determine a user has not worked their arms as much as other muscle groups, and present, via the user interface 2300, a recommended class 2310 associated with working the arms.

Examples of Body Tracking Using Movement Information

As described herein, various body tracking algorithms and pose/exercise classification techniques can utilize movement information when attempting to track a user and/or determine what poses/exercises are performed by the user. The movements database 160 reflects such integration by storing information 1640 for the ML algorithms associated with the movements.

For example, when a class has a class plan that includes movements as units of the class, the systems described herein can perform body tracking at the movement level. When the user is performing a certain movement (e.g., bicep curls), the class plan identifies the movement, and the classification system 140, or other body tracking systems, can determine whether the user has performed bicep curls. When the systems determine the user has performed as expected, the body focus system 175 can credit the user for performing the movement, as described herein.

Figure 24:
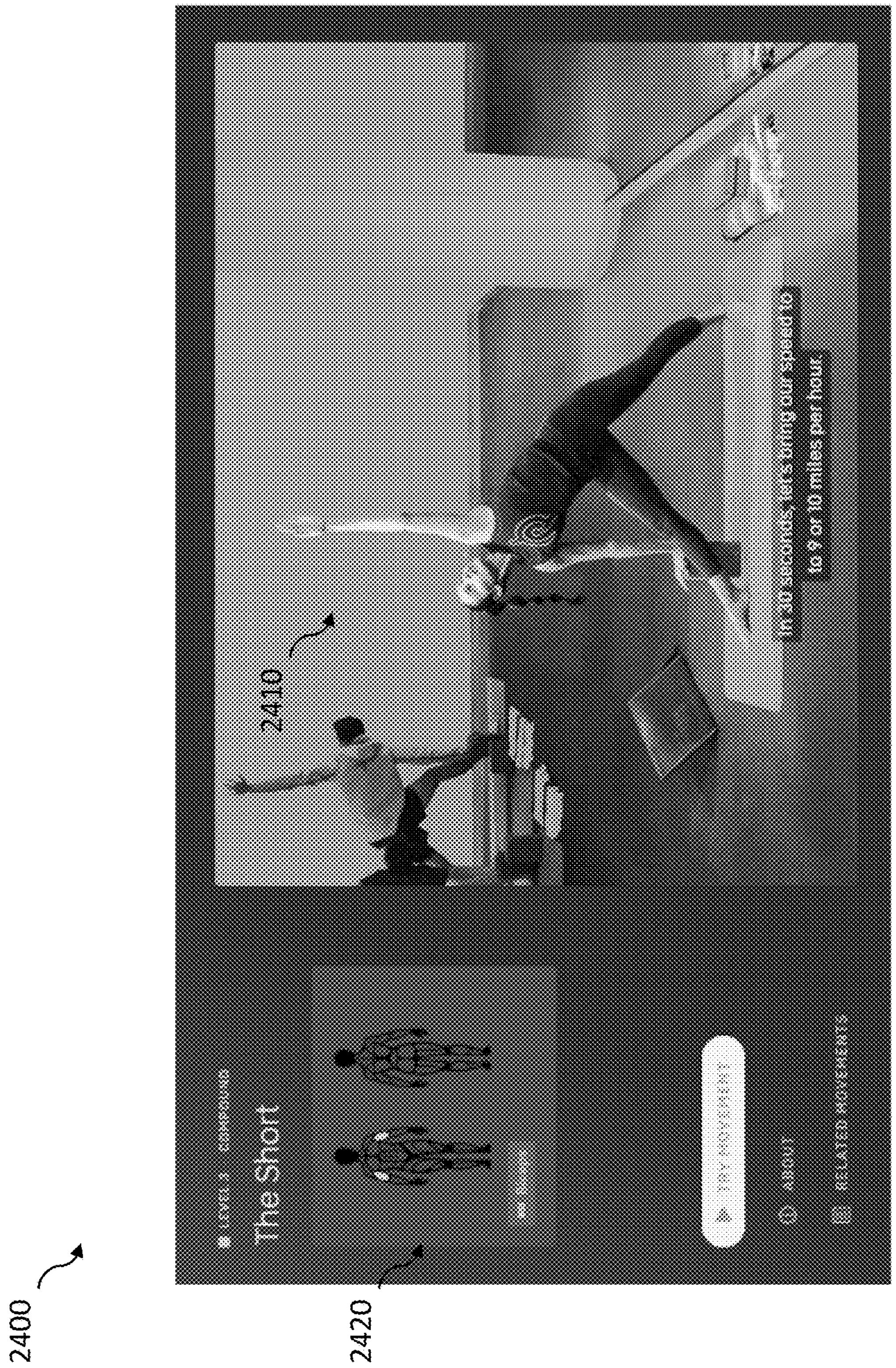
FIG. 24 is a diagram illustrating an example user interface that presents practice information to a user of an activity.

Further, in some embodiments, the body focus system 175 can access the movement library 165 to obtain videos and other content associated with a movement. FIG. 24 depicts a user interface 2400 that presents practice information to a user of an activity. The user interface 2400 includes a video 2410 and information 2420 identifying the muscle groups worked during the movement, among other information or content presented to the user.

In addition, the system 175 can facilitate the overlay of a user performing a movement next to an instructor performing the movement via one on the videos associated with the movement.

Examples of Dynamically Generating Classes for Users

As described herein, the dynamic class system 180 can utilize information stored by the movements database 160 when dynamically generating a class or classes for the user 105. For example, the dynamic class system 180 can access information for the user 105 from the body focus system 175 and determine one or more muscles to target in a new class for the user 105.

The system 180 can access the movements database 160 using movements associated with the targeted muscles and dynamically generate a new class for the user that incorporates videos and other content identified by the database 160 as being associated with the movements. Similarly, as described herein, the system 180 can generate a recommendation for a class sequence, where different existing classes (or sections of classes) are presented to the user based on the muscles or muscle groups identified to target.

The dynamic class system 180, in some cases, receives input from the user to guide the class generation. The user can instruct the system 180 to generate a class schedule (e.g., series of classes) that targets certain goals, muscle groups, and so on. For example, the user can provide guidance to request a series of classes that provide a "balanced workout," and the system 180 can generate the class (or the class recommendation) that satisfies the request, based on the information in the body focus system 175.

Further, trainers, friends, and/or other users associated with the user can provide class plans or training guidelines, which the dynamic class system 180 can utilize as guidance when generating classes for users (or recommendations) that are informed by information within the body focus system 175.

In some cases, the dynamic class system 180 can track and store information associated with dynamically generated classes, including metrics that identify the completion of classes, the usage of classes, and so on. For example, a combination of various aspects of the body focus system 175 and the dynamic class system 180, along with the rep counting and follow along techniques described herein, can provide users (and their trainers) with a platform for tracking whether the users' workout activities are satisfying their goals/plans/programs, among other benefits.

Further, the dynamic class system 180 can modify operations of an exercise machine based on movement changes. For example, the system 180 can dynamically change a weight applied to an exercise machine (e.g., a motor-controlled strength machine), or cause the machine to modify operation, as the user proceeds through different movements in a class. The system 180, having access to the movements within the class, can adjust the weight (or resistance or speed or other parameters of a machine) as the class switches movements. As an example, the system 180 can cause a strength machine to increase the applied weight when a class switches from a bicep curl movement to a shoulder press movement, and then cause the machine to lower the weight when the class switches back to the bicep curl movement.

Thus, as described herein, creating a movements database 160 that stores information related to movements can facilitate an immersive, expanded user experience for users of connected fitness platforms and services. The movements database 160 enables such systems to present users with detailed class content, class recommendations, body tracking information, and individualized classes and other content.

Example User Interfaces

Figure 25A:
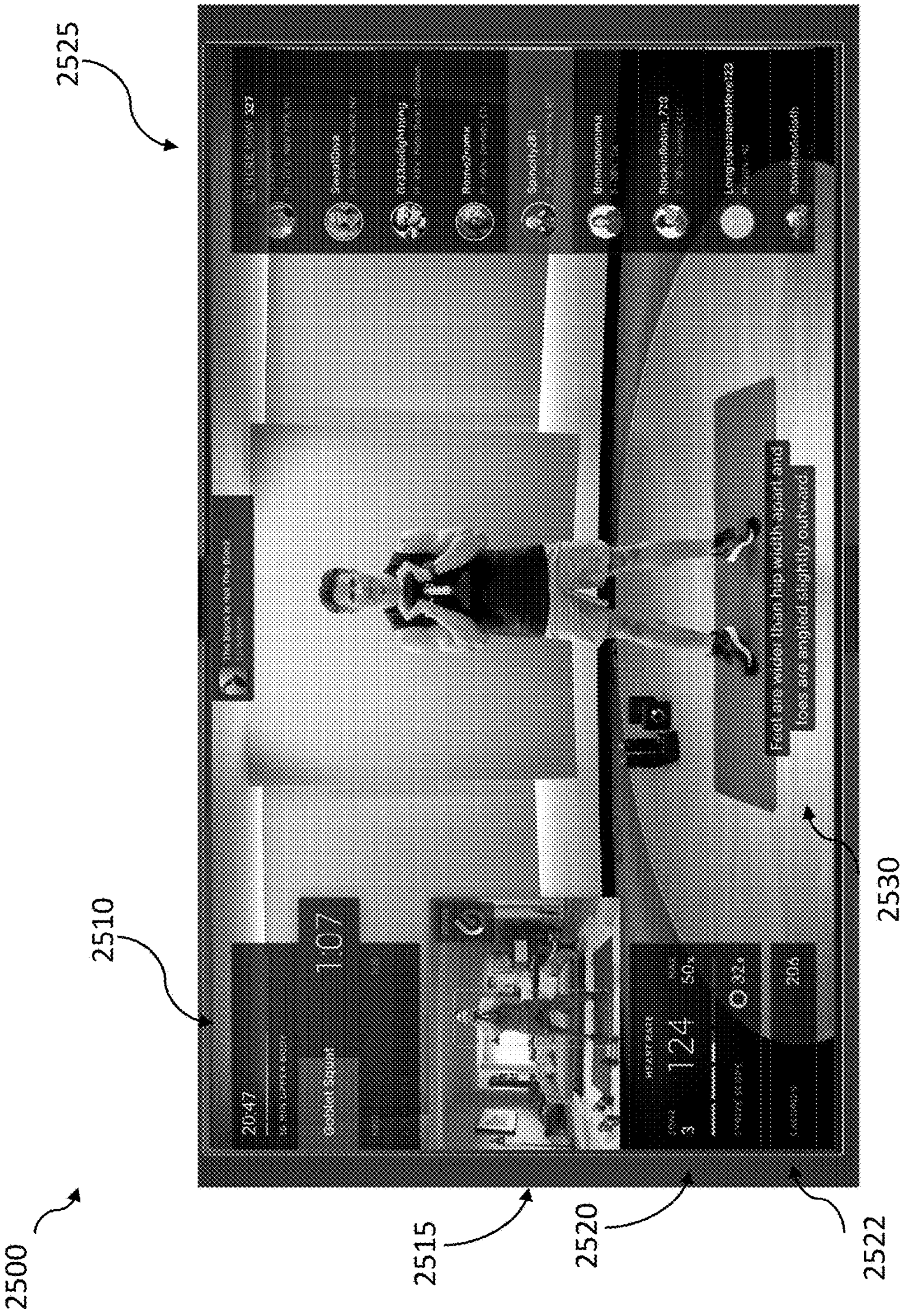
FIGS. 25A-25D are diagrams illustrating example user interfaces presented to a user during a class.

FIGS. 25A-25D are diagrams illustrating example user interfaces presented during a class. For example, FIG. 25A is a user interface 2500 that presents a timeline module 2510 or element in an upper left area, a participant view module or element 2515 in a left side area, a heart rate module 2520 or element in a lower left area, an output module 2522 or element in a bottom left area, a class roster module 2525 or element in a right side area, and an instructor view module 2530 or element in a center area.

Figure 25B:
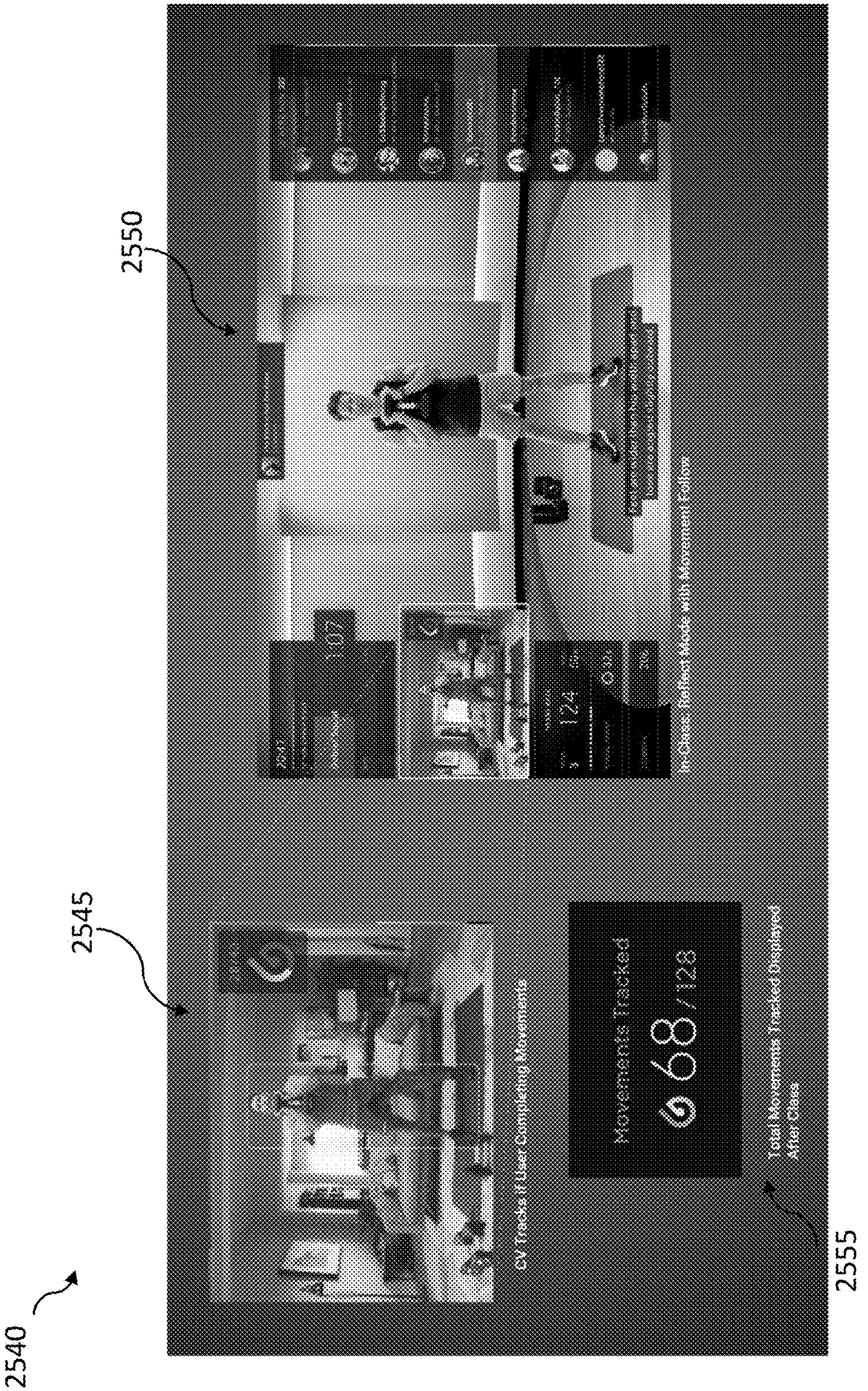

As another example, FIG. 25B is a user interface 2540 that presents a participant view module 2545 or element in a left side area and next to an instructor view module 2550 or element in a center area. The participant view can be enlarged, and a movements tracked graphical user interface module 2555, or element presents tracking information or metrics.

Figure 25C:
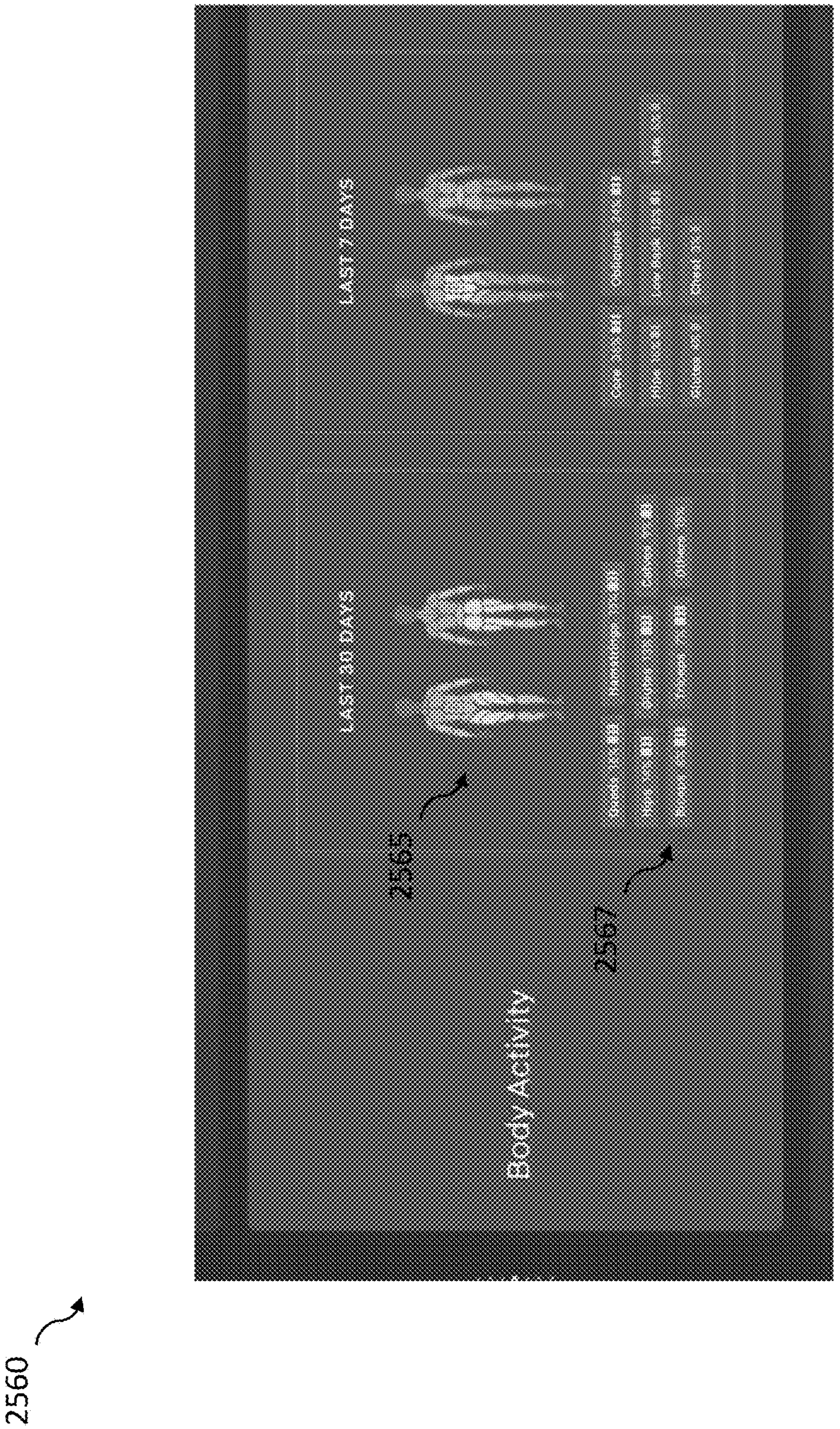
Figure 25D:
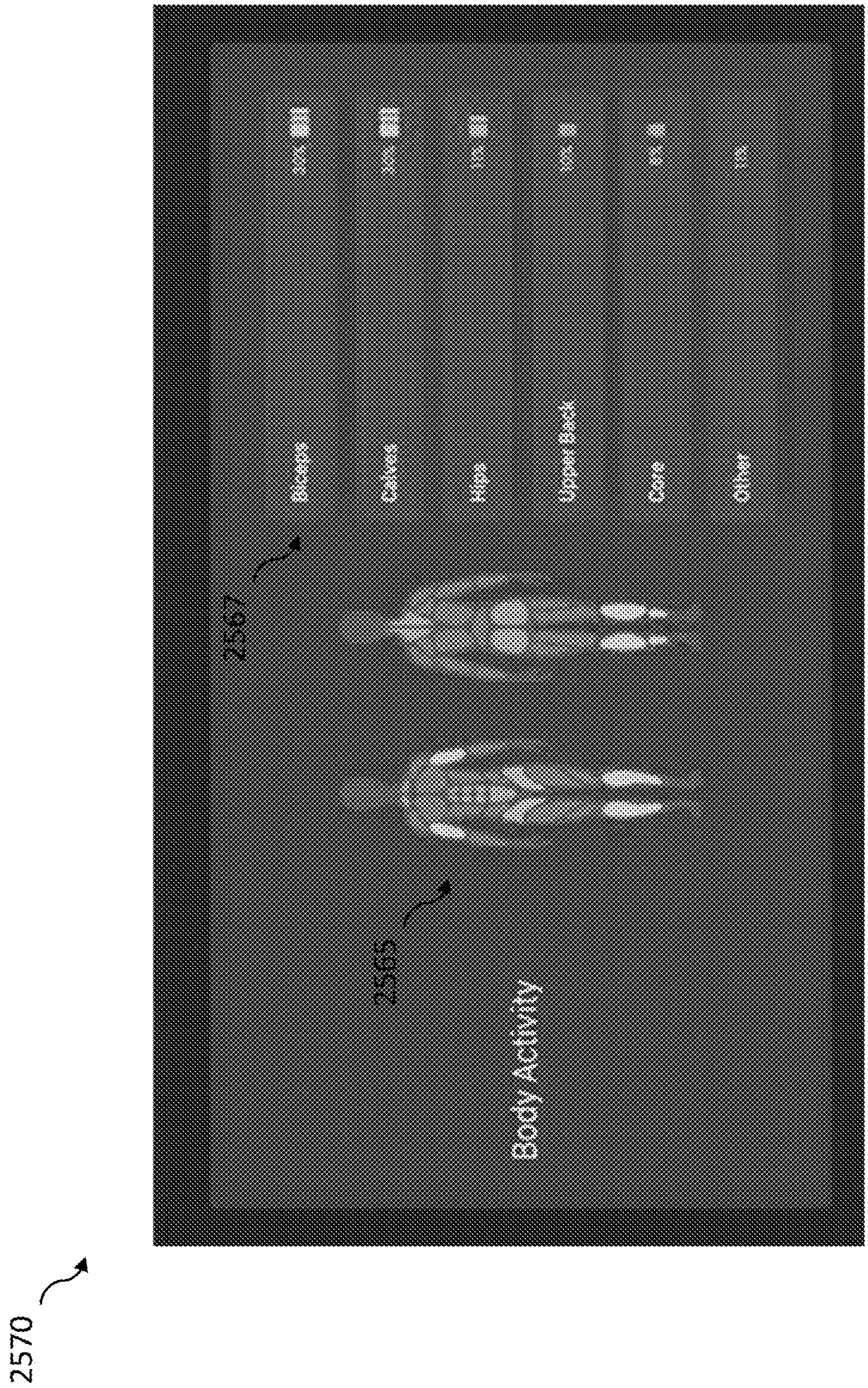

As another example, FIGS. 25C-D are user interfaces 2560, 2570 that present a body activity module 2565 or element with different muscle groups selectively shaded or illuminated to indicate different levels of intensity exerted by a participant on each muscle group during one or more exercise classes. The user interfaces 2560, 2570 also include statistics regarding the muscles groups utilized during workouts, such as relative percentages, total movements, and so on.

Of course, the systems described herein can utilize other interfaces, avatars, display elements or modules. Further, the systems can display various types of content or metadata, such as the content/metadata described herein.

Example Embodiments of the Disclosed Technology

As described herein, the disclosed technology can include various systems, methods, databases, or operations described herein.

In some embodiments, the disclosed technology utilizes various AI/ML frameworks to classify poses/exercises/movements, count repetitions of activity, track movements, and so on.

For example, the technology can receive one or more images that capture a pose of a user performing an exercise activity, provide the one or more images to a machine learning classification network, and receive, from the machine learning classification network, a prediction of the pose performed by the user during the exercise activity.

The machine learning classification network can include a classification network that performs a pose classification for the pose of the user performing the exercise activity depicted in the one or more images, and a match network that matches the pose of the user performing the exercise activity depicted in the one or more images to a template to determine a match prediction for the pose depicted in the one or more images, where the prediction of the pose performed by the user during the exercise activity is based on the pose classification performed by the classification network and the match prediction determined by the match network.

The machine learning classification network can include a series of encoding layers and decoding layers to generate a predicted keypoint heatmap for the one or more images as a feature map for the one or more images and additional downsampling layers and a Softmax function that generate a pose classification from the feature map.

The machine learning classification network can include a series of encoding layers and decoding layers that generate a BBox heatmap having peaks that correspond to a center of the user within the one or more images and a keypoint heatmap having channel-wise peaks for keypoints of the one or more images.

The machine learning classification network can include a series of encoding layers and decoding layers that generate a pose heatmap having channel-wise peaks that correspond to a pose the user is currently performing within the one or more images.

The machine learning classification network can include a series of encoding layers and decoding layers that generate a BBox heatmap having peaks that correspond to a center of the user within the one or more images, an ROIAlign (Region of Interest Align) operation that extracts a feature map from the BBox heatmap, and additional downsampling layers, and a fully connected and softmax layer, which generate a pose prediction for the pose captured in the one or more images.

The machine learning classification network can be a system that includes an encoding neural network that generates one or more embeddings of the one or more images of the user performing poses, a set of template embeddings that represent possible poses performed by the user, and a match component that matches the generated one or more embeddings to the set of template embeddings to predict the pose captured in the one or more images.

As another example, a method receives one or more images that capture an exercise of a user performing an exercise activity, provides the one or more images to a machine learning classification network, and receives, from the machine learning classification network, a prediction of an exercise performed by the user during the exercise activity.

The machine learning classification network can include a classification network that performs an exercise classification for the exercise of the user performing the exercise activity depicted in the one or more images and a match network that matches the exercise of the user performing the exercise activity depicted in the one or more images to a template to determine a match prediction for the exercise depicted in the one or more images, where the prediction of the exercise performed by the user during the exercise activity is based on the exercise classification performed by the classification network and the match prediction determined by the match network.

The machine learning classification network can include a 3D-CNN (three-dimensional convolution neural network), a TSM network, or a combination thereof, that collects feature maps associated with the one or more images across a fixed time window and collates and passes the feature maps through a series of convolution layers to output an exercise classification for the exercise performed by the user during the exercise activity.

As another example, a repetition counting system detects a repetitive motion of a user during an activity, confirms the user is performing an identifiable pose or movement during the activity, and determines the user is performing the activity based on the detected repetitive motion and the confirmation that the user performed the identifiable pose or movement during the activity.

The classification network can detect the repetitive motion of the user during the activity and a matching network confirms the user is performing the identifiable pose or movement during the activity.

As another example, a method identifies one or more inflection points within a sequence of multiple images of a user performing an exercise activity, tracks movement of the one or more inflection points within the sequence of multiple images, and determines the user is performing the exercise activity based on the tracked movement of the one or more inflection points within the sequence of multiple images.

The method can determine the one or more inflection points have moved at least one complete cycle of movement within the sequence of multiple images.

In some embodiments, a connected fitness system includes a user interface, a media hub in communication with the user interface that captures images of a user performing a workout and presents content to the user via the user interface, a classification system that classifies poses or exercises performed by the user based from the images captured by the media hub, and a body focus system that generates content to be presented to the user via the user interface, where the content is generated based on classifications of the poses or exercises performed by the user.

In some embodiments, one or more computer memories that store a data structure associated with connected fitness information to be presented to a user of an exercise machine, the data structure including one or more entries, where each of the entries includes information identifying a movement to be performed by a user during an exercise activity, and metadata associated with the movement to be performed by the user during the exercise activity.

In some cases, the movement is a unit of a class presented to the user during the exercise activity and/or an atomic unit of a class presented to the user during the exercise activity.

In some cases, the metadata associated with the movement to be performed by the user during the exercise activity includes context information for the movement that identifies a body part or muscle group associated with the movement.

In some cases, the metadata associated with the movement to be performed by the user during the exercise activity includes context information for the movement that identifies a description of the movement.

In some cases, the metadata associated with the movement to be performed by the user during the exercise activity includes context information for the movement that identifies an exercise machine or exercise equipment associated with the movement.

In some cases, the metadata associated with the movement to be performed by the user during the exercise activity includes an identifier that represents a machine learning algorithm associated with tracking the movement when the movement is performed by the user during the exercise activity.

In some cases, the metadata associated with the movement to be performed by the user during the exercise activity includes information that identifies related movements.

In some cases, the metadata associated with the movement to be performed by the user during the exercise activity includes information that identifies variations to the movement.

In some cases, the metadata associated with the movement to be performed by the user during the exercise activity includes information that identifies content stored in a movement library that is associated with the movement.

In some embodiments, a method for presenting workout information to a user performing an exercise activity includes determining that a user has successfully completed a movement within the exercise activity, identifying one or more muscle groups associated with the movement, and presenting information via a user interface associated with the user that represents the identified one or more muscle groups.

In some cases, identifying one or more muscle groups associated with the movement includes accessing a movements database that relates movements to metadata associated with the movements, and extracting, from the metadata associated with the movement successfully completed within the exercise activity, the identified one or more muscle groups associated with the movement.

In some cases, presenting information via a user interface associated with the user that represents the identified one or more muscle groups includes presenting a body avatar within the user interface and highlighting, via the body avatar, the one or more muscle groups.

In some cases, the user interface is part of a mobile device associated with the user and/or part of a display device of an exercise machine utilized by the user during the exercise activity.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the electric bike and bike frame may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments are not limited except as by the appended claims.

What is claimed is:

1. A method, comprising:

receiving one or more images that capture a pose of a user performing an exercise activity;

providing the one or more images to a machine learning classification network, wherein the machine learning classification network includes a series of encoding layers and decoding layers to generate a predicted keypoint heatmap for the one or more images as a feature map for the one or more images and additional downsampling layers and a Softmax function that generate a pose classification from the feature map; and receiving, from the machine learning classification network, a prediction of the pose performed by the user during the exercise activity.

2. The method of claim 1, wherein the machine learning classification network includes:

a classification network that performs a pose classification for the pose of the user performing the exercise activity depicted in the one or more images;

a match network that matches the pose of the user performing the exercise activity depicted in the one or more images to a template to determine a match prediction for the pose depicted in the one or more images;

wherein the prediction of the pose performed by the user during the exercise activity is based on the pose classification performed by the classification network and the match prediction determined by the match network.

3. The method of claim 1, wherein the machine learning classification network is a system that includes:

an encoding neural network that generates one or more embeddings of the one or more images of the user performing poses;

a set of template embeddings that represent possible poses performed by the user; and a match component that matches the generated one or more embeddings to the set of template embeddings to predict the pose captured in the one or more images.

4. A method, comprising:

receiving one or more images that capture an exercise of a user performing an exercise activity;

providing the one or more images to a machine learning classification network, wherein the machine learning classification network includes a 3D-CNN (three-dimensional convolution neural network), a temporal shift module (TSM) network, or a combination thereof, configured to:

collect feature maps associated with the one or more images across a fixed time window; and collate and pass the feature maps through a series of convolution layers to output an exercise classification for the exercise performed by the user during the exercise activity; and receiving, from the machine learning classification network, a prediction of an exercise performed by the user during the exercise activity.

5. The method of claim 4, wherein the machine learning classification network includes:

a classification network that performs an exercise classification for the exercise of the user performing the exercise activity depicted in the one or more images; and a match network that matches the exercise of the user performing the exercise activity depicted in the one or more images to a template to determine a match prediction for the exercise depicted in the one or more images;

wherein the prediction of the exercise performed by the user during the exercise activity is based on the exercise classification performed by the classification network and the match prediction determined by the match network.

6. The method of claim 4, further comprising:

detecting, via the one or more images, a repetitive motion of the user during performance of the exercise activity;

confirming the user is performing an identifiable pose or movement during the exercise activity based on the prediction of the exercise performed by the user during the exercise activity; and determining the user is performing the exercise activity based on the detected repetitive motion and the confirmation that the user performed the identifiable pose or movement during the exercise activity.

7. The method of claim 6, wherein a classification network detects the repetitive motion of the user during the activity, and wherein a matching network confirms the user is performing the identifiable pose or movement during the activity.

8. The method of claim 4, wherein the machine learning classification network includes:

an encoding neural network that generates one or more embeddings of the one or more images of the user performing exercises;

a set of template embeddings that represent possible exercises performed by the user; and a match component that matches the generated one or more embeddings to the set of template embeddings to predict the exercise captured in the one or more images.

9. The method of claim 4, further comprising:

presenting information via a user interface associated with the user that identifies one or more muscle groups of the user associated with the predicted exercise performed by the user during the exercise activity.

10. The method of claim 4, further comprising:

generating content to be presented to the user via a user interface associated with the user, wherein the content is generated based on the determination that the user is performing the exercise activity.

11. A method, comprising:

receiving one or more images that capture a pose of a user performing an exercise activity;

providing the one or more images to a machine learning classification network, wherein the machine learning classification network includes a series of encoding layers and decoding layers that generate a pose heatmap having channel-wise peaks that correspond to a pose the user is currently performing within the one or more images; and receiving, from the machine learning classification network, a prediction of the pose performed by the user during the exercise activity.

12. The method of claim 11, wherein the machine learning classification network includes:

a classification network that performs a pose classification for the pose of the user performing the exercise activity depicted in the one or more images; and a match network that matches the pose of the user performing the exercise activity depicted in the one or more images to a template to determine a match prediction for the pose depicted in the one or more images;

wherein the prediction of the pose performed by the user during the exercise activity is based on the pose classification performed by the classification network and the match prediction determined by the match network.

13. The method of claim 11, further comprising:

presenting information via a user interface associated with the user that identifies one or more muscle groups of the user associated with the predicted pose performed by the user during the exercise activity.

14. The method of claim 11, further comprising:

generating content to be presented to the user via a user interface associated with the user, wherein the content is generated based on the determination that the user is performing the exercise activity.

* * * * *